(12) United States Patent
Kuang et al.

(10) Patent No.: US 11,089,576 B2
(45) Date of Patent: Aug. 10, 2021

(54) SIDELINK RESOURCE SCHEDULING METHOD, APPARATUS, AND SYSTEM

(71) Applicant: Huawei Technologies Co., Ltd., Shenzhen (CN)

(72) Inventors: Yiru Kuang, Beijing (CN); Haibo Xu, Beijing (CN); Jian Wang, Beijing (CN); Yongbo Zeng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/464,453

(22) PCT Filed: Jan. 23, 2017

(86) PCT No.: PCT/CN2017/072289
§ 371 (c)(1),
(2) Date: May 28, 2019

(87) PCT Pub. No.: WO2018/094872
PCT Pub. Date: May 31, 2018

(65) Prior Publication Data

US 2019/0364554 A1 Nov. 28, 2019

(30) Foreign Application Priority Data

Nov. 26, 2016 (CN) .......................... 201611057252.3

(51) Int. Cl.
*H04W 4/00* (2018.01)
*H04W 72/04* (2009.01)
(Continued)

(52) U.S. Cl.
CPC ....... *H04W 72/0406* (2013.01); *H04L 5/0053* (2013.01); *H04W 72/0453* (2013.01); *H04W 72/1205* (2013.01); *H04W 88/04* (2013.01)

(58) Field of Classification Search
CPC ............... H04W 72/042; H04W 76/27; H04W 72/0453; H04W 72/0406; H04W 88/04;
(Continued)

(56) References Cited

U.S. PATENT DOCUMENTS

2002/0054578 A1* 5/2002 Zhang .................. H04L 1/0001
370/328
2014/0086152 A1* 3/2014 Bontu ..................... H04W 4/70
370/329
(Continued)

FOREIGN PATENT DOCUMENTS

CN 104954976 A 9/2015
CN 105594293 A 5/2016
(Continued)

OTHER PUBLICATIONS

Machine Translation and Abstract of Chinese Publication No. CN104954976, Sep. 30, 2015, 73 pages.
(Continued)

*Primary Examiner* — Atique Ahmed
(74) *Attorney, Agent, or Firm* — Maier & Maier, PLLC

(57) ABSTRACT

A sidelink resource scheduling method includes receiving, by first user equipment, a first message from a network server, where the first message includes first information allocated by the network server to at least one second user equipment, and the first information indicates a data channel sidelink resource corresponding to the second user equipment, determining, by the first user equipment based on the first message, a second message corresponding to the at least one second user equipment, and sending the second message corresponding to the at least one second user equipment to the corresponding second user equipment, where the second message includes the first information.

18 Claims, 9 Drawing Sheets

(51) Int. Cl.
*H04L 5/00* (2006.01)
*H04W 72/12* (2009.01)
*H04W 88/04* (2009.01)

(58) Field of Classification Search
CPC . H04W 72/1205; H04L 5/0053; H04L 5/0007
See application file for complete search history.

(56) References Cited

U.S. PATENT DOCUMENTS

| | | | |
|---|---|---|---|
| 2014/0269641 A1* | 9/2014 | Jang | H04L 5/0048 370/336 |
| 2014/0317173 A1* | 10/2014 | Karkkainen | H04N 21/238 709/203 |
| 2015/0271807 A1* | 9/2015 | Patil | H04W 52/383 455/426.1 |
| 2016/0227518 A1 | 8/2016 | Li et al. | |
| 2016/0234754 A1 | 8/2016 | Baghel | |
| 2016/0381666 A1 | 12/2016 | Kim et al. | |
| 2017/0026939 A1* | 1/2017 | Fodor | H04L 5/0073 |
| 2017/0064733 A1* | 3/2017 | Lee | H04W 72/1278 |
| 2017/0094656 A1* | 3/2017 | Chen | H04W 76/14 |
| 2017/0164381 A1* | 6/2017 | Kim | H04L 5/0007 |
| 2017/0171690 A1* | 6/2017 | Kim | H04L 51/02 |
| 2017/0196013 A1* | 7/2017 | Shin | H04W 76/14 |
| 2018/0049259 A1* | 2/2018 | Aminaka | H04W 56/002 |
| 2019/0029061 A1* | 1/2019 | Feng | H04W 72/14 |

FOREIGN PATENT DOCUMENTS

| | | |
|---|---|---|
| CN | 106063352 A | 10/2016 |
| WO | 2016013826 A1 | 1/2016 |
| WO | 2016181094 A1 | 11/2016 |
| WO | 2016182601 A1 | 11/2016 |

OTHER PUBLICATIONS

Foreign Communication From a Counterpart Application, PCT Application No. PCT/CN2017/072289, English Translation of International Search Report dated Aug. 15, 2017, 3 pages.

Foreign Communication From a Counterpart Application, PCT Application No. PCT/CN2017/072289, English Translation of Written Opinion dated Aug. 15, 2017, 5 pages.

Zte, "Discussions on D2D UE-to-network Relay," XP050934586, R1-151725, 3GPP TSG-RAN WG1 Meeting #80bis, Belgrade, Serbia, Apr. 20-24, 2015, 6 pages.

Zte, "Resource scheme for UE-to-network Relay UE and remote UE," XP051001441, R1-154050, 3GPP TSG-RAN WG1 Meeting #82, Beijing, China, Aug. 24-28, 2015, 6 pages.

Foreign Communication From a Counterpart Application, European Application No. 17874908.1, Extended European Search Report dated Oct. 7, 2019, 10 pages.

* cited by examiner

| Index | LCID value |
|---|---|
| 00000 | Common control channel |
| 00001-01010 | Logical channel identity |
| 01011-10101 | Reserved bits |
| 10110 | First MAC CE |
| 10111 | Second MAC CE |
| ... | ... |

Downlink shared channel LCID value table

| | | |
|---|---|---|
| Identifier 1 | Sidelink resource scheduling information | Oct 1 |
| Sidelink resource scheduling information | | Oct 2 |
| Sidelink resource scheduling information | | Oct 3 |
| Sidelink resource scheduling information | | Oct 4 |
| Sidelink resource scheduling information | | Oct 5 |
| Identifier 2 | Sidelink resource scheduling information | Oct 6 |
| Sidelink resource scheduling information | | Oct 7 |
| Sidelink resource scheduling information | | Oct 8 |
| Sidelink resource scheduling information | | Oct 9 |
| Sidelink resource scheduling information | | Oct 10 |

First MAC CE

| | |
|---|---|
| Identifier 1 | Third information |
| Third information | |
| Third information | |
| Third information | |
| Third information | |
| Identifier 2 | Third information |
| Third information | |
| Third information | |
| Third information | |
| Third information | |

Second MAC CE

FIG. 3

| Identifier 1 | Sidelink resource scheduling information | Oct 1 |
|---|---|---|
| Sidelink resource scheduling information | | Oct 2 |
| Sidelink resource scheduling information | | Oct 3 |
| Sidelink resource scheduling information | | Oct 4 |
| Sidelink resource scheduling information | | Oct 5 |
| Third information | | Oct 6 |
| Third information | | Oct 7 |
| Third information | | Oct 8 |
| Third information | | Oct 9 |

First MAC CE

| Identifier 2 | Sidelink resource scheduling information | Oct 1 |
|---|---|---|
| Sidelink resource scheduling information | | Oct 2 |
| Sidelink resource scheduling information | | Oct 3 |
| Sidelink resource scheduling information | | Oct 4 |
| Sidelink resource scheduling information | | Oct 5 |
| Third information | | Oct 6 |
| Third information | | Oct 7 |
| Third information | | Oct 8 |
| Third information | | Oct 9 |

First MAC CE

FIG. 4

| Identifier 1 | Sidelink resource scheduling information | Oct 1 |
|---|---|---|
| Sidelink resource scheduling information | | Oct 2 |
| Sidelink resource scheduling information | | Oct 3 |
| Sidelink resource scheduling information | | Oct 4 |
| Sidelink resource scheduling information | | Oct 5 |
| Identifier 2 | Sidelink resource scheduling information | Oct 6 |
| Sidelink resource scheduling information | | Oct 7 |
| Sidelink resource scheduling information | | Oct 8 |
| Sidelink resource scheduling information | | Oct 9 |
| Sidelink resource scheduling information | | Oct 10 |

First MAC CE

FIG. 5

| Index | LCID value |
|---|---|
| 00000 | Reserved bits |
| 00001-01010 | Logical channel identity |
| 01011-11010 | Reserved bits |
| 11011 | Third MAC CE |
| ... | ... |

Sidelink shared channel LCID value table

| | |
|---|---|
| Identifier 1 | Oct 1 |
| Sidelink resource scheduling information | Oct 2 |
| Sidelink resource scheduling information | Oct 3 |
| Sidelink resource scheduling information | Oct 4 |

Third MAC CE

FIG. 6

SIDELINK RESOURCE SCHEDULING METHOD, APPARATUS, AND SYSTEM

CROSS-REFERENCE TO RELATED APPLICATIONS

This application is a U.S. National Stage of International Patent Application No. PCT/CN2017/072289 filed on Jan. 23, 2017, which claims priority to Chinese Patent Application No. 201611057252.3 filed on Nov. 26, 2016. Both of the aforementioned applications are hereby incorporated by reference in their entireties.

TECHNICAL FIELD

This application relates to the field of communications technologies, and in particular, to a sidelink resource scheduling method, apparatus, and system.

BACKGROUND

Device-to-device (Device-to-Device, D2D) is a communication mode in which a transmit end directly sends data to a receive end without forwarding by a base station or through a network. In a relatively special D2D communication mode, user equipment (User Equipment, UE) is connected to a network by using another UE having a relay function. The former UE is referred to as remote user equipment (Remote UE), the later UE is referred to as relay user equipment (Relay UE), a link between the remote user equipment and a base station is referred to as a cellular link, and a link between the remote user equipment and the relay user equipment is referred to as a sidelink (sidelink).

In an existing D2D communication process, the remote UE directly sends a sidelink buffer status report to the base station over the cellular link, the base station directly sends sidelink scheduling information to the remote UE over the cellular link, and voice, videos, data, and the like are sent over the sidelink without being forwarded by the base station. The remote UE needs to maintain both the sidelink and the cellular link. Because an implementation solution for listening on the sidelink and the cellular link and receiving control signaling and data messages over the two links is relatively complex, and transmit power on the cellular link is higher than transmit power on the sidelink, the existing remote UE has a relatively complex implementation solution and relatively high power consumption.

SUMMARY

To resolve a problem that an existing remote UE has a relatively complex implementation solution and relatively high power consumption, this application provides a sidelink resource scheduling method, apparatus, and system.

According to a first aspect, this application provides a sidelink resource scheduling method, applied to a side of first user equipment, including:

receiving a first message sent by a network server, where the first message includes first information, and the first information indicates a data channel sidelink resource allocated by the network server to corresponding second user equipment; and determining, by the first user equipment based on the first message, a second message corresponding to the at least one second user equipment, and sending the at least one second message to the corresponding second user equipment, where the second message includes the first information of the second user equipment.

In the foregoing process, the first user equipment receives the first message that indicates the sidelink resource allocated by the network server to each second user equipment, and determines, based on the first message, the second message to be forwarded to each second user equipment, so that the second user equipment can receive sidelink scheduling information over a sidelink, and can obtain the sidelink resource without maintaining a cellular link between the second user equipment and the network server, thereby lowering complexity of the second user equipment, and reducing power consumption of the second user equipment.

In a possible implementation, the first message further includes second information, and the second information indicates a control channel sidelink resource allocated by the network server to the corresponding second user equipment.

In a possible implementation, the first message further includes third information allocated by the network server to the at least one second user equipment, and the third information indicates a forwarding resource used by the first user equipment to forward the second message of the at least one second user equipment; the first information and the second information of the at least one second user equipment are encapsulated into a first MAC CE in the first message for sending, and the first MAC CE further includes an identifier of the at least one second user equipment; and the third information of the at least one second user equipment is encapsulated into a second MAC CE in the first message for sending, and the second MAC CE further includes the identifier of the at least one second user equipment.

The first message is sent at a MAC layer, so that sidelink scheduling can be performed for a plurality of second user equipments at the same time, and a physical layer technology does not need to be modified. In addition, in the foregoing form of the first message, if no forwarding resource needs to be configured, the second MAC CE may directly not be configured. Flexibility is relatively high. Because only the two MAC CEs are required, overheads are relatively low when there are a relatively large quantity of second user equipments.

In a possible implementation, the first message further includes third information allocated by the network server to the at least one second user equipment, and the third information indicates a forwarding resource used by the first user equipment to forward the second message of the at least one second user equipment; and the first information, the second information, and the third information of the second user equipment are encapsulated into a first MAC CE in the first message for sending, and the first MAC CE further includes an identifier of the second user equipment.

Compared with the preceding possible implementation method, a different MAC CE format is used. Because sidelink scheduling resource information and a forwarding resource of each second user equipment occupy one MAC CE, and each MAC CE has a corresponding identifier and header, this form of the first message is applicable to a case in which sidelink resource scheduling is performed for a relatively small quantity of second user equipments at the same time.

In a possible implementation, the first information and the second information of the at least one second user equipment are encapsulated into a first MAC CE in the first message for sending, and the first MAC CE further includes an identifier of the at least one second user equipment.

Optionally, the second message is directly forwarded by using the first information and the second information in the first message without configuring a forwarding resource.

Compared with the foregoing two forms of the first message, occupied bandwidth resources are reduced.

In a possible implementation, the receiving, by first user equipment, a first message sent by a network server includes:

receiving, by the first user equipment, the first message that is sent by the network server on at least one physical downlink control channel. The first message further includes an identifier of the at least one second user equipment. The foregoing implementable implementation proposes a sidelink resource scheduling method in which the first message is sent at a physical layer.

The technical solution provided in the foregoing embodiment in which the first message is sent at the physical layer has slight modification to an existing communications protocol, and is easy to understand and implement.

In a possible implementation, the receiving, by first user equipment, a first message sent by a network server includes:

receiving, by the first user equipment, the first message that is sent by the network server on at least one physical downlink control channel; and the determining, by the first user equipment based on the first message, a second message corresponding to the at least one second user equipment includes:

descrambling, by the first user equipment, the physical downlink control channel based on a sidelink radio network temporary identifier of the second user equipment, and determining a correspondence between the first message sent on the physical downlink control channel and the second user equipment. The foregoing implementable implementation proposes another sidelink resource scheduling method in which the first message is sent at the physical layer.

The technical solution provided in the foregoing embodiment in which the first message is sent at the physical layer has slight modification to an existing communications protocol, and is easy to understand and implement.

In a possible implementation, before the sending the second message corresponding to the at least one second user equipment to the corresponding second user equipment, the method further includes:

obtaining, by the first user equipment, a forwarding resource that is allocated by the network server and that is used to forward the second message of the at least one second user equipment. When the first message is sent at the physical layer but the second message is sent at the MAC layer, the forwarding resource needs to be additionally obtained.

In a possible implementation, the sending the second message corresponding to the at least one second user equipment to the corresponding second user equipment includes:

sending, by the first user equipment, the second message corresponding to the at least one second user equipment to the corresponding second user equipment by using the forwarding resource. In this implementation, the second message is sent by using the obtained forwarding resource.

In a possible implementation, the sending the second message corresponding to the at least one second user equipment to the corresponding second user equipment includes:

sending, by the first user equipment, the second message corresponding to the at least one second user equipment to the corresponding second user equipment by using a resource indicated by the first information and the second information in the first message.

In this implementation, if no forwarding resource is obtained, the second message is directly sent based on the first information and the second information.

In a possible implementation, the first information of the second user equipment is encapsulated into sidelink control information of the second message for sending, and the sidelink control information further includes at least one of the following: the identifier of the corresponding second user equipment, a frequency hopping identifier, a time resource mode, and a modulation and coding scheme; and the sending the second message corresponding to the at least one second user equipment to the corresponding second user equipment includes:

sending, by the first user equipment, the second message to the corresponding second user equipment on a physical sidelink control channel by using the control channel sidelink resource that is indicated by the second information and that corresponds to the second user equipment.

In this implementation, a specific implementation for sending the second message at the physical layer is proposed. Because the second user equipment does not need to send sidelink control information but needs to send only a data message, the data message can be completely sent within one sidelink control period, thereby implementing rapid scheduling, reducing a scheduling delay, and reducing signaling overheads.

In a possible implementation, before the sending the second message corresponding to the at least one second user equipment to the corresponding second user equipment, the method further includes:

receiving, by the first user equipment, maximum forwarding duration sent by the network server, where the maximum forwarding duration is used to indicate maximum duration for the first user equipment to send each second message; and the sending the second message corresponding to the at least one second user equipment to the corresponding second user equipment includes:

autonomously selecting, by the first user equipment, a resource from a resource pool configured by the network server, and sending the at least one second message to the corresponding second user equipment within the maximum forwarding duration.

In the foregoing process, to reduce occupied bandwidth, a resource configuration manner of autonomous selection may be used, and the first user equipment sends the second message within the received maximum forwarding duration.

In a possible implementation, before the sending the second message corresponding to the at least one second user equipment to the corresponding second user equipment, the method further includes:

receiving, by the first user equipment, maximum forwarding duration sent by the network server, where the maximum forwarding duration is used to indicate maximum duration for the first user equipment to send each second message.

The maximum forwarding duration is configured, so that data packet collision can be avoided, thereby improving data transmission efficiency.

In a possible implementation, the maximum forwarding duration is sent by using radio resource control signaling. The radio resource control signaling is used for sending, so that a quantity of signaling exchange times can be reduced.

In a possible implementation, when information is encapsulated into the first MAC CE in the first message for sending, the maximum forwarding duration is also encapsulated into the first message.

In a possible implementation, a sending priority of the second message is higher than a sending priority of another message sent by the first user equipment. The priorities are set, so that timeliness of sidelink resource scheduling can be ensured.

In a possible implementation, the first message further includes a logical channel identifier value corresponding to the MAC CE; and the determining, by the first user equipment based on the first message, a second message corresponding to the at least one second user equipment includes:

reading, by the first user equipment, the MAC CE in the first message based on the logical channel identifier value in the first message; and determining, by the first user equipment based on the MAC CE, the second message corresponding to the at least one second user equipment.

In a possible implementation, when the second message further includes the second information of the second user equipment, the first information and the second information of the second user equipment are encapsulated into a third MAC CE in the second message for sending, the third MAC CE further includes the identifier of the second user equipment, and the second message further includes a logical channel identifier value corresponding to the third MAC CE.

According to a second aspect, this application provides a sidelink resource scheduling method, applied to a side of a network server, including: sending a first message to first user equipment, where the first message is used to determine a second message corresponding to at least one second user equipment, where the first message includes first information and second information, the first information indicates a data channel sidelink resource allocated by the network server to the corresponding second user equipment, and the second information indicates a control channel sidelink resource allocated by the network server to the corresponding second user equipment.

In a possible implementation, the first message further includes third information allocated by the network server to the at least one second user equipment, and the third information indicates a forwarding resource used by the first user equipment to forward the second message of the at least one second user equipment, the first information and the second information of the at least one second user equipment are encapsulated into a first MAC CE in the first message for sending, and the first MAC CE further includes an identifier of the at least one second user equipment; and the third information of the at least one second user equipment is encapsulated into a second MAC CE in the first message for sending, and the second MAC CE further includes the identifier of the at least one second user equipment.

In a possible implementation, the first message further includes third information allocated by the network server to the at least one second user equipment, and the third information indicates a forwarding resource used by the first user equipment to forward the second message of the at least one second user equipment; and the first information, the second information, and the third information of the second user equipment are encapsulated into a first MAC CE in the first message for sending, and the first MAC CE further includes an identifier of the at least one second user equipment.

In a possible implementation, the first information and the second information of the at least one second user equipment are encapsulated into a first MAC CE in the first message for sending, and the first MAC CE further includes an identifier of the at least one second user equipment.

In a possible implementation, the first message further includes an identifier of the second user equipment corresponding to the first information and the second information, and the sending, by a network server, a first message to first user equipment includes:

sending, by the network server, the first message to the first user equipment on at least one physical downlink control channel.

In a possible implementation, the sending, by a network server, a first message to first user equipment includes:

sending, by the network server, the first message to the first user equipment on at least one physical downlink control channel scrambled by using a sidelink radio network temporary identifier of the second user equipment.

In a possible implementation, the method further includes:

receiving, by the network server, a forwarding resource request message sent by the first user equipment; and sending, by the network server to the first user equipment, a forwarding resource used to forward the second message of the at least one second user equipment.

In a possible implementation, the method further includes:

sending, by the network server, maximum forwarding duration to the first user equipment, where the maximum forwarding duration is used to indicate maximum duration for the first user equipment to send the second message of the at least one second user equipment.

In a possible implementation, the maximum forwarding duration is sent by using radio resource control signaling.

In a possible implementation, when a sidelink resource is encapsulated into the first MAC CE in the first message for sending, the maximum forwarding duration is also encapsulated into the first MAC CE.

In a possible implementation, the first message further includes a logical channel identifier value corresponding to the MAC CE.

According to a third aspect, this application provides a sidelink resource scheduling method, applied to a side of second user equipment, including: receiving a message sent by first user equipment, where the message includes first information, and the first information indicates a data channel sidelink resource allocated by a network server to the corresponding second user equipment; and sending, by the second user equipment, a data message to the first user equipment based on the message.

In a possible implementation, the first information is encapsulated into sidelink control information of the message for sending, and the sidelink control information includes at least one of the following: an identifier of the corresponding second user equipment, a frequency hopping identifier, a time resource mode, and a modulation and coding scheme; and the sending a data message to the first user equipment includes:

sending, by the second user equipment, the data message to the first user equipment on a physical sidelink shared channel based on the first information and at least one of the following: the identifier of the corresponding second user equipment, the frequency hopping identifier, the time resource mode, and the modulation and coding scheme by using the data channel sidelink resource that is indicated by the first information and that corresponds to the second user equipment.

In a possible implementation, the message further includes second information, the second information indicates a control channel sidelink resource allocated by the network server to the second user equipment, the first information and the second information of the second user equipment are encapsulated into a MAC CE in the second message for sending, the MAC CE further includes an identifier of the second user equipment, and the message further includes a logical channel identifier value corresponding to the MAC CE; and after the receiving, by second user equipment, a message sent by first user equipment, the method further includes:

reading, by the second user equipment, the MAC CE in the message based on the logical channel identifier value in the message to obtain the first information and the second information.

According to a fourth aspect to a sixth aspect, this application further provides sidelink resource scheduling apparatuses respectively configured to perform the sidelink resource scheduling methods according to the first to third aspects. The apparatuses and the methods have same technical features and technical effects, and details are not described again in this application.

According to a fourth aspect, this application provides relay user equipment, including:

a receiving unit, configured to receive a first message sent by a network server, where the first message includes first information, and the first information indicates a data channel sidelink resource allocated by the network server to a corresponding remote user equipment;

a processing unit, configured to determine, based on the first message, a second message corresponding to the at least one remote user equipment; and a sending unit, configured to send the second message corresponding to the at least one remote user equipment to the corresponding remote user equipment, where the second message includes the first information of the remote user equipment.

In a possible implementation, the first message further includes second information, and the second information indicates a control channel sidelink resource allocated by the network server to the corresponding remote user equipment.

In a possible implementation, the first message further includes third information allocated by the network server to the at least one remote user equipment, and the third information indicates a forwarding resource used by the relay user equipment to forward the second message of the at least one remote user equipment:

the first information and the second information of the at least one remote user equipment are encapsulated into a first MAC CE in the first message for sending, and the first MAC CE further includes an identifier of the at least one remote user equipment; and the third information of the at least one remote user equipment is encapsulated into a second MAC CE in the first message for sending, and the second MAC CE further includes the identifier of the at least one remote user equipment.

In a possible implementation, the first message further includes third information allocated by the network server to the at least one remote user equipment, and the third information indicates a forwarding resource used by the relay user equipment to forward the second message of the at least one remote user equipment; and the first information, the second information, and the third information of the remote user equipment are encapsulated into a first MAC CE in the first message for sending, and the first MAC CE further includes an identifier of the remote user equipment.

In a possible implementation, the first information and the second information of the at least one remote user equipment are encapsulated into a first MAC CE in the first message for sending, and the first MAC CE further includes an identifier of the at least one remote user equipment.

In a possible implementation, the receiving unit is specifically configured to receive the first message that is sent by the network server on at least one physical downlink control channel, where the first message further includes an identifier of the at least one remote user equipment.

In a possible implementation, the receiving unit is specifically configured to receive the first message that is sent by the network server on at least one physical downlink control channel; and the processing unit is specifically configured to descramble the physical downlink control channel based on a sidelink radio network temporary identifier of the remote user equipment, and determine a correspondence between the first message sent on the physical downlink control channel and the remote user equipment.

In a possible implementation, the receiving unit is further configured to obtain a forwarding resource that is allocated by the network server and that is used to forward the second message of the at least one remote user equipment.

In a possible implementation, the sending unit is specifically configured to send the second message corresponding to the at least one remote user equipment to the corresponding remote user equipment by using the forwarding resource.

In a possible implementation, the sending unit is specifically configured to send the second message corresponding to the at least one remote user equipment to the corresponding remote user equipment by using a resource indicated by the first information and the second information in the first message.

In a possible implementation, the first information of the remote user equipment is encapsulated into sidelink control information of the second message for sending, and the sidelink control information further includes at least one of the following: the identifier of the corresponding remote user equipment, a frequency hopping identifier, a time resource mode, and a modulation and coding scheme; and the sending unit is specifically configured to send the second message to the corresponding remote user equipment on a physical sidelink control channel by using the control channel sidelink resource that is indicated by the second information and that corresponds to the remote user equipment.

In a possible implementation, the receiving unit is further configured to receive maximum forwarding duration sent by the network server, where the maximum forwarding duration is used to indicate maximum duration for the relay user equipment to send each second message; and the sending unit is specifically configured to autonomously select a resource from a resource pool configured by the network server, and send the second message corresponding to the at least one remote user equipment to the corresponding remote user equipment within the maximum forwarding duration.

In a possible implementation, the receiving unit is further configured to receive maximum forwarding duration sent by the network server, where the maximum forwarding duration is used to indicate maximum duration for the relay user equipment to send each second message.

In a possible implementation, the maximum forwarding duration is sent by using radio resource control signaling.

In a possible implementation, when information is encapsulated into the first MAC CE in the first message for sending, the maximum forwarding duration is also encapsulated into the first message.

In a possible implementation, a sending priority of the second message is higher than a sending priority of another message sent by the relay user equipment.

In a possible implementation, the first message further includes a logical channel identifier value corresponding to the MAC CE; and the processing unit is specifically configured to read the MAC CE in the first message based on the logical channel identifier value in the first message; and determine, based on the MAC CE, the second message corresponding to the at least one remote user equipment.

In a possible implementation, when the second message further includes the second information of the remote user equipment, the first information and the second information of the remote user equipment are encapsulated into a third MAC CE in the second message for sending, and the third MAC CE further includes the identifier of the remote user equipment; and the second message further includes a logical channel identifier value corresponding to the third MAC CE.

According to a fifth aspect, this application provides a network server, including:

a sending unit, configured to send a first message to relay user equipment, where the first message is used to determine a second message corresponding to at least one remote user equipment, where the first message includes first information and second information, the first information indicates a data channel sidelink resource allocated by the network server to the corresponding remote user equipment, and the second information indicates a control channel sidelink resource allocated by the network server to the corresponding remote user equipment.

In a possible implementation, the first message further includes third information allocated by the network server to the at least one remote user equipment, and the third information indicates a forwarding resource used by the relay user equipment to forward the second message of the at least one remote user equipment;

the first information and the second information of the at least one remote user equipment are encapsulated into a first MAC CE in the first message for sending, and the first MAC CE further includes an identifier of the at least one remote user equipment; and the third information of the at least one remote user equipment is encapsulated into a second MAC CE in the first message for sending, and the second MAC CE further includes the identifier of the at least one remote user equipment.

In a possible implementation, the first message further includes third information allocated by the network server to the at least one remote user equipment, and the third information indicates a forwarding resource used by the relay user equipment to forward the second message of the at least one remote user equipment; and the first information, the second information, and the third information of the remote user equipment are encapsulated into a first MAC CE in the first message for sending, and the first MAC CE further includes an identifier of the at least one remote user equipment.

In a possible implementation, the first information and the second information of the at least one remote user equipment are encapsulated into a first MAC CE in the first message for sending, and the first MAC CE further includes an identifier of the at least one remote user equipment.

In a possible implementation, the first message further includes an identifier of the remote user equipment corresponding to the first information and the second information, and the sending unit is specifically configured to send the first message to the relay user equipment on at least one physical downlink control channel.

In a possible implementation the sending unit is specifically configured to send the first message to the relay user equipment on at least one physical downlink control channel scrambled by using a sidelink radio network temporary identifier of the remote user equipment.

In a possible implementation, the network server further includes:

a receiving unit, configured to receive a forwarding resource request message sent by the relay user equipment; and the sending unit is further configured to send, to the relay user equipment, a forwarding resource used to forward the second message of the at least one remote user equipment.

In a possible implementation, the sending unit is further configured to send maximum forwarding duration to the relay user equipment, where the maximum forwarding duration is used to indicate maximum duration for the relay user equipment to send the second message of the at least one remote user equipment.

In a possible implementation, the maximum forwarding duration is sent by using radio resource control signaling.

In a possible implementation, when a sidelink resource is encapsulated into the first MAC CE in the first message for sending, the maximum forwarding duration is also encapsulated into the first MAC CE.

In a possible implementation, the first message further includes a logical channel identifier value corresponding to the MAC CE.

According to a sixth aspect, this application provides remote user equipment, including:

a receiving unit, configured to receive a message sent by relay user equipment, where the message includes first information, and the first information indicates a data channel sidelink resource allocated by a network server to the corresponding remote user equipment; and a sending unit, configured to send a data message to the relay user equipment based on the message.

In a possible implementation, the first information is encapsulated into sidelink control information of the message for sending, and the sidelink control information includes at least one of the following: an identifier of the corresponding remote user equipment, a frequency hopping identifier, a time resource mode, and a modulation and coding scheme; and the sending unit is specifically configured to send the data message to the relay user equipment on a physical sidelink shared channel based on the first information and at least one of the following: the identifier of the corresponding remote user equipment, the frequency hopping identifier, the time resource mode, and the modulation and coding scheme by using the data channel sidelink resource that is indicated by the first information and that corresponds to the remote user equipment.

In a possible implementation, the message further includes second information, the second information indicates a control channel sidelink resource allocated by the network server to the corresponding remote user equipment, the first information and the second information of the remote user equipment are encapsulated into a MAC CE in the second message for sending, the MAC CE further includes an identifier of the remote user equipment, and the message further includes a logical channel identifier value corresponding to the MAC CE; and the remote user equipment further includes:

a processing unit, configured to read the MAC CE in the message based on the logical channel identifier value in the message to obtain the first information and the second information.

This application further provides relay user equipment, a network server, and remote user equipment that are configured to perform the sidelink resource scheduling methods according to the first to third aspects. The apparatuses and the methods have same technical features and technical effects, and details are not described again in this application.

According to a seventh aspect, this application provides relay user equipment, including:

a receiver, configured to receive a first message sent by a network server, where the first message includes first information, and the first information indicates a data channel sidelink resource allocated by the network server to a corresponding remote user equipment;

a processor, configured to determine, based on the first message, a second message corresponding to the at least one remote user equipment; and a transmitter, configured to send the second message corresponding to the at least one remote user equipment to the corresponding remote user equipment, where the second message includes the first information of the remote user equipment.

In a possible implementation, the first message further includes second information, and the second information indicates a control channel sidelink resource allocated by the network server to the corresponding remote user equipment.

In a possible implementation, the first message further includes third information allocated by the network server to the at least one remote user equipment, and the third information indicates a forwarding resource used by the relay user equipment to forward the second message of the at least one remote user equipment;

the first information and the second information of the at least one remote user equipment are encapsulated into a first MAC CE in the first message for sending, and the first MAC CE further includes an identifier of the at least one remote user equipment; and the third information of the at least one remote user equipment is encapsulated into a second MAC CE in the first message for sending, and the second MAC CE further includes the identifier of the at least one remote user equipment.

In a possible implementation, the first message further includes third information allocated by the network server to the at least one remote user equipment, and the third information indicates a forwarding resource used by the relay user equipment to forward the second message of the at least one remote user equipment; and the first information, the second information, and the third information of the remote user equipment are encapsulated into a first MAC CE in the first message for sending, and the first MAC CE further includes an identifier of the remote user equipment.

In a possible implementation, the first information and the second information of the at least one remote user equipment are encapsulated into a first MAC CE in the first message for sending, and the first MAC CE further includes an identifier of the at least one remote user equipment.

In a possible implementation, the receiver is specifically configured to receive the first message that is sent by the network server on at least one physical downlink control channel, where the first message further includes an identifier of the at least one remote user equipment.

In a possible implementation, the receiver is specifically configured to receive the first message that is sent by the network server on at least one physical downlink control channel; and the processor is specifically configured to descramble the physical downlink control channel based on a sidelink radio network temporary identifier of the remote user equipment, and determine a correspondence between the first message sent on the physical downlink control channel and the remote user equipment.

In a possible implementation, the receiver is further configured to obtain a forwarding resource that is allocated by the network server and that is used to forward the second message of the at least one remote user equipment.

In a possible implementation, the transmitter is specifically configured to send the second message corresponding to the at least one remote user equipment to the corresponding remote user equipment by using the forwarding resource.

In a possible implementation, the transmitter is specifically configured to send the second message corresponding to the at least one remote user equipment to the corresponding remote user equipment by using a resource indicated by the first information and the second information in the first message.

In a possible implementation, the first information of the remote user equipment is encapsulated into sidelink control information of the second message for sending, and the sidelink control information further includes at least one of the following: the identifier of the corresponding remote user equipment, a frequency hopping identifier, a time resource mode, and a modulation and coding scheme; and the transmitter is specifically configured to send the second message to the corresponding remote user equipment on a physical sidelink control channel by using the control channel sidelink resource that is indicated by the second information and that corresponds to the remote user equipment.

In a possible implementation, the receiver is further configured to receive maximum forwarding duration sent by the network server, where the maximum forwarding duration is used to indicate maximum duration for the relay user equipment to send each second message; and the transmitter is specifically configured to autonomously select a resource from a resource pool configured by the network server, and send the second message corresponding to the at least one remote user equipment to the corresponding remote user equipment within the maximum forwarding duration.

In a possible implementation, the receiver is further configured to receive maximum forwarding duration sent by the network server, where the maximum forwarding duration is used to indicate maximum duration for the relay user equipment to send each second message.

In a possible implementation, the maximum forwarding duration is sent by using radio resource control signaling.

In a possible implementation, when information is encapsulated into the first MAC CE in the first message for sending, the maximum forwarding duration is also encapsulated into the first message.

In a possible implementation, a sending priority of the second message is higher than a sending priority of another message sent by the relay user equipment.

In a possible implementation, the first message further includes a logical channel identifier value corresponding to the MAC CE; and the processor is specifically configured to read the MAC CE in the first message based on the logical channel identifier value in the first message; and determine, based on the MAC CE, the second message corresponding to the at least one remote user equipment.

In a possible implementation, when the second message further includes the second information of the remote user equipment, the first information and the second information of the remote user equipment are encapsulated into a third MAC CE in the second message for sending, and the third MAC CE further includes the identifier of the remote user equipment; and the second message further includes a logical channel identifier value corresponding to the third MAC CE.

According to an eighth aspect, this application provides a network server including:

a transmitter, configured to send a first message to relay user equipment, where the first message is used to determine a second message corresponding to at least one remote user equipment, where the first message includes first information and second information, the first information indicates a data channel sidelink resource allocated by the network server to the corresponding remote user equipment, and the second information indicates a control channel sidelink resource allocated by the network server to the corresponding remote user equipment.

In a possible implementation, the first message further includes third information allocated by the network server to the at least one remote user equipment, and the third information indicates a forwarding resource used by the relay user equipment to forward the second message of the at least one remote user equipment;

the first information and the second information of the at least one remote user equipment are encapsulated into a first MAC CE in the first message for sending, and the first MAC CE further includes an identifier of the at least one remote user equipment; and the third information of the at least one remote user equipment is encapsulated into a second MAC CE in the first message for sending, and the second MAC CE further includes the identifier of the at least one remote user equipment.

In a possible implementation, the first message further includes third information allocated by the network server to the at least one remote user equipment, and the third information indicates a forwarding resource used by the relay user equipment to forward the second message of the at least one remote user equipment; and the first information, the second information, and the third information of the remote user equipment are encapsulated into a first MAC CE in the first message for sending, and the first MAC CE further includes an identifier of the at least one remote user equipment.

In a possible implementation, the first information and the second information of the at least one remote user equipment are encapsulated into a first MAC CE in the first message for sending, and the first MAC CE further includes an identifier of the at least one remote user equipment.

In a possible implementation, the first message further includes an identifier of the remote user equipment corresponding to the first information and the second information, and the transmitter is specifically configured to send the first message to the relay user equipment on at least one physical downlink control channel.

In a possible implementation, the transmitter is specifically configured to send the first message to the relay user equipment on at least one physical downlink control channel scrambled by using a sidelink radio network temporary identifier of the remote user equipment.

In a possible implementation, the network server further includes:

a receiver, configured to receive a forwarding resource request message sent by the relay user equipment; and the transmitter is further configured to send, to the relay user equipment, a forwarding resource used to forward the second message of the at least one remote user equipment.

In a possible implementation, the transmitter is further configured to send maximum forwarding duration to the relay user equipment, where the maximum forwarding duration is used to indicate maximum duration for the relay user equipment to send the second message of the at least one remote user equipment.

In a possible implementation, the maximum forwarding duration is sent by using radio resource control signaling.

In a possible implementation, when a sidelink resource is encapsulated into the first MAC CE in the first message for sending, the maximum forwarding duration is also encapsulated into the first MAC CE.

In a possible implementation, the first message further includes a logical channel identifier value corresponding to the MAC CE.

According to a ninth aspect, this application provides remote user equipment, including:

a receiver, configured to receive a message sent by relay user equipment, where the message includes first information, and the first information indicates a data channel sidelink resource allocated by a network server to the corresponding remote user equipment; and a transmitter, configured to send a data message to the relay user equipment based on the message.

In a possible implementation, the first information is encapsulated into sidelink control information of the message for sending, and the sidelink control information includes at least one of the following: an identifier of the corresponding remote user equipment, a frequency hopping identifier, a time resource mode, and a modulation and coding scheme; and the transmitter is specifically configured to send the data message to the relay user equipment on a physical sidelink shared channel based on the first information and at least one of the following: the identifier of the corresponding remote user equipment, the frequency hopping identifier, the time resource mode, and the modulation and coding scheme by using the data channel sidelink resource that is indicated by the first information and that corresponds to the remote user equipment.

In a possible implementation, the message further includes second information, the second information indicates a control channel sidelink resource allocated by the network server to the corresponding remote user equipment, the first information and the second information of the remote user equipment are encapsulated into a MAC CE in the second message for sending, the MAC CE further includes an identifier of the remote user equipment, and the message further includes a logical channel identifier value corresponding to the MAC CE; and the remote user equipment further includes:

a processor, configured to read the MAC CE in the message based on the logical channel identifier value in the message to obtain the first information and the second information.

According to a tenth aspect, this application provides a sidelink resource scheduling system, including the relay user equipment according to the fourth aspect, the network server according to the fifth aspect, and the remote user equipment according to the sixth aspect.

According to an eleventh aspect, this application provides a computer-readable storage medium, including an instruction. When the instruction runs on a computer, the computer performs the sidelink resource scheduling method according to the first aspect.

According to a twelfth aspect, this application provides a computer-readable storage medium, including an instruction. When the instruction runs on a computer, the computer performs the sidelink resource scheduling method according to the second aspect.

According to a thirteenth aspect, this application provides a computer-readable storage medium, including an instruction. When the instruction runs on a computer, the computer performs the sidelink resource scheduling method according to the third aspect.

BRIEF DESCRIPTION OF DRAWINGS

FIG. 3 is a schematic structural diagram of a MAC CE according to Embodiment 1 of this application;

FIG. 4 is a schematic structural diagram of a MAC CE according to Embodiment 2 of this application;

FIG. 5 is a schematic structural diagram of a MAC CE according to Embodiment 3 of this application;

FIG. 6 is a schematic structural diagram of a MAC CE according to Embodiment 4 of this application;

DESCRIPTION OF EMBODIMENTS

Figure 1:
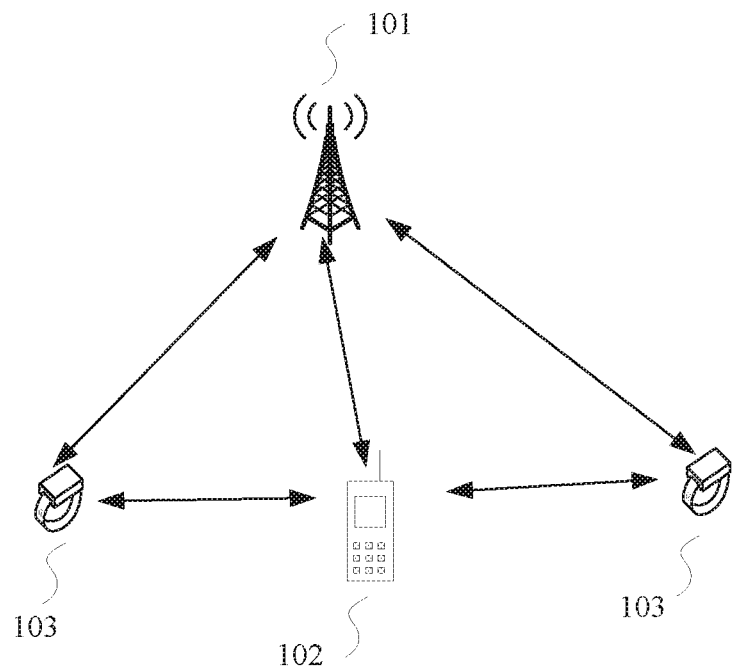
FIG. 1 is a schematic diagram of an application scenario of a sidelink resource scheduling method according to this application.

FIG. 1 is a schematic diagram of an application scenario of a sidelink resource scheduling method according to this application. As shown in FIG. 1, the application scenario includes: a network server 101, relay user equipment 102, and at least one remote user equipment 103. The network server 101 is configured to provide a communications network and allocate uplink and downlink dynamic resources to the user equipments. The network server 101 may be, for example, a base station. The user equipment is a device that can be connected to the communications network provided by the network server 101, and can send and receive data and communicate with another user equipment in the network. For example, the user equipment may be a computer, a tablet computer, a mobile phone, and a wearable device such as a headset, a wristband, or a watch. When user equipment is located within a coverage area of the network provided by the network server 101, and has a relay function to enable another user equipment outside the coverage area of the network to be connected to the network by using the user equipment, the user equipment may be referred to as the relay user equipment 102, and the another user equipment outside the coverage area of the network may be referred to as the remote user equipment 103. The remote user equipment 103 may be a common wearable device such as a headset or a wristband. A plurality of remote user equipments 103 may access the network by using a same relay user equipment 102.

In a system architecture shown in FIG. 1, a process in which the remote user equipment 103 obtains control signaling and obtains sidelink resource before the remote user equipment 103 in radio resource management (Radio Resource Management, RRC) connected mode needs to transmit data to the network server 101 by using the relay user equipment 102, in other words, transmits communication data over a sidelink, is a sidelink resource scheduling process. This application provides a new resource scheduling method. During existing resource scheduling, the sidelink resource is directly obtained over a cellular link provided by the network server. Consequently, the remote user equipment 103 needs to simultaneously maintain the two links. However, an implementation solution for simultaneously listening on the sidelink and the cellular link and receiving control signaling and data messages over the two links is relatively complex. Therefore, the remote user equipment has a complex implementation solution and relatively high power consumption.

To resolve the foregoing problem, this application provides a sidelink resource scheduling method. The sidelink resource scheduling method provided in this application is described below in detail by using specific embodiments.

Figure 2:
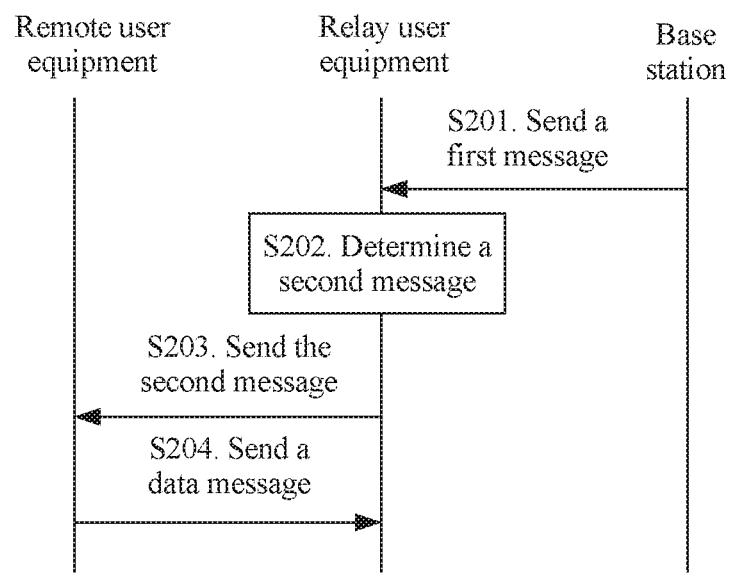
FIG. 2 is a schematic flowchart of a sidelink resource scheduling method according to Embodiment 1 of this application.

FIG. 2 is a schematic flowchart of a sidelink resource scheduling method according to Embodiment 1 of this application. As shown in FIG. 2, the method includes the following steps.

S201. Send a first message.

Specifically, a network server sends the first message to first user equipment. The first message includes first information, and the first information indicates a data channel sidelink resource allocated by the network server to corresponding second user equipment.

S202. Determine a second message.

Specifically, the first user equipment receives the first message sent by the network server, and determines, based on the first message, the second message corresponding to the at least one second user equipment.

S203. Send the second message.

Specifically, the first user equipment sends the at least one second message to the corresponding second user equipment. The second message includes the first information of the second user equipment.

S204. Send a data message.

Specifically, the second user equipment receives the second message sent by the first user equipment, and sends the data message to the first user equipment based on the received second message.

For example, the data message sent by the second user equipment to the first user equipment may be, for example, voice, a video, or data collected by various sensors.

Specifically, the network server may be the network server 101 shown in FIG. 1, the first user equipment may be the relay user equipment 102 shown in FIG. 1, and the second user equipment may be the remote user equipment 103 shown in FIG. 1. In FIG. 2, only one second user equipment is used as an example for description, but does not limit a quantity of second user equipments.

Specifically, in S201, the network server allocates a sidelink resource to the at least one second user equipment, and sends the first message to the first user equipment. The first message includes sidelink resource scheduling information that indicates the sidelink resource. For example, the first message may be sent at a Media Access Control (Media Access Control, MAC) layer or a physical layer. When the first message is sent at the MAC layer, the first message includes a MAC protocol data unit (MAC Protocol Data Unit, MAC PDU). One MAC PDU includes at least one MAC control element (MAC Control Element, MAC CE). For example, according to a property of the sidelink resource indicated in the sidelink resource scheduling information, the first message includes the first information, and the first information indicates the data channel sidelink resource corresponding to the second user equipment.

Optionally, the first message further includes second information, and the second information indicates a control channel sidelink resource allocated by the network server to the corresponding second user equipment. The network server sends first information and second information of all second user equipments to the relay user equipment.

Specifically, in S202, after receiving the first message sent by the network server, the first user equipment obtains, based on the first message, the second message corresponding to the at least one second user equipment. For example, when the first message includes an identifier of the at least one second user equipment, the first user equipment may obtain, based on the identifier of the at least one second user equipment and a correspondence between an identifier and first information in the first message, the first information corresponding to the second user equipment as the second message. Optionally, the identifier of the second user equipment may be a device number of the second user equipment.

Specifically, in S203, the first user equipment sends the corresponding second message to the at least one second user equipment. For example, similar to the first message, the second message may be sent at the MAC layer or the physical layer. When the second message is sent at the MAC layer, the second message includes the first information and the second information of the second user equipment. When the second message is sent at the physical layer, for example, the second message including the first information may be sent to the corresponding second user equipment based on the control channel sidelink resource indicated by the second information.

Specifically, in S204, after receiving the second message, the second user equipment may send the data message to the first user equipment based on the second message. For example, when the second message is sent at the MAC layer, the second user equipment sends the data message to the first user equipment based on the first information and the second information. When the second message is sent at the physical layer, the second user equipment sends the data message to the first user equipment based on the first information.

The sidelink resource scheduling method provided in this application includes: sending, by the network server, the first message to the first user equipment, where the first message indicates the sidelink resource allocated by the network server to the at least one second user equipment; determining, by the first user equipment based on the received first message, the second message corresponding to the at least one second user equipment, and sending the corresponding second message to the at least one second user equipment, where the second message includes the sidelink resource allocated by the network server; and after receiving the second message, sending, by the second user equipment, the data message to the first user equipment based on the second message. The first user equipment forwards the sidelink resource allocated by the network server to the at least one second user equipment, so that the second user equipment can obtain the sidelink resource without maintaining a cellular link between the second user equipment and the network server, thereby lowering complexity of the second user equipment, and reducing power consumption of the second user equipment.

For example, based on the embodiment shown in FIG. 2, before the sending a first message in S201, the sidelink resource scheduling method provided in this application further includes:

sending, by the at least one second user equipment, a sidelink buffer status report to the network server, and allocating, by the network server, a sidelink resource to each second user equipment based on a sidelink buffer status report of each second user equipment.

For example, the second user equipment may send the sidelink buffer status report to the first user equipment, and the first user equipment forwards the sidelink buffer status report; or the second user equipment may directly send the sidelink buffer status report to the network server. The sidelink buffer status report is used to reflect a total amount of data to be sent by the second user equipment in an uplink buffer. The network server allocates a proper quantity of resources to the second user equipment based on the amount of data in the buffer. For example, the second user equipment may alternatively send a sidelink scheduling request to the network server, to directly request a specific quantity of sidelink resources.

When the network server allocates the proper quantity of resources to the second user equipment based on the amount of data in the buffer, resources are allocated relatively quickly and properly. When the specific quantity of sidelink resources are directly requested, resources are allocated relatively flexibly.

Optionally, when the second user equipment sends the sidelink buffer status report, the identifier of the second user equipment may be further carried.

Based on any one of the foregoing embodiments, during specific sidelink resource scheduling for the second user equipment by using the first user equipment, the first message sent by the network server to the first user equipment and the second message sent by the first user equipment to the second user equipment each may be sent as MAC layer signaling or physical layer signaling. Different layers correspond to different resource scheduling methods. The first message and the second message may be sent at different layers. For example, there are four solutions to sidelink resource scheduling: Solution 1: the first message is sent at the MAC layer, and the second message is sent at the MAC layer. Solution 2: the first message is sent at the MAC layer, and the second message is sent at the physical layer. Solution 3: the first message is sent at the physical layer, and the second message is sent at the MAC layer. Solution 4: the first message is sent at the physical layer, and the second message is sent at the physical layer. In addition, in a D2D communication process, a resource used by the first user equipment to forward the second message is allocated through autonomous selection by user equipment or scheduling. In the resource allocation manner of autonomous selection by user equipment, the network server configures a resource pool for the user equipment by using a broadcast message or dedicated signaling, and the user equipment may autonomously select a resource from the resource pool to transmit data. In the resource allocation manner of scheduling, user equipment in connected mode needs to request a resource from the network server by using dedicated signaling, and the network server schedules a sidelink-specific resource for the user equipment to transmit data. Different resource allocation manners also correspond to different sidelink resource scheduling methods.

The sidelink resource scheduling method provided in this application is described below in detail by using specific embodiments in different aspects such as the four solutions and the resource allocation manners configured by the base station for the first user equipment.

For the solution 1 and the solution 2: The first message from the network server to the first user equipment is sent at the MAC layer. When the base station configures the resource allocation manner of scheduling for the first user equipment, the first message specifically includes the following forms:

First form of the first message:

The first message further includes third information allocated by the network server to the at least one second user equipment, and the third information indicates a forwarding resource used by the first user equipment to forward the second message of the at least one second user equipment.

The third information of the at least one second user equipment is encapsulated into a second MAC CE in the first message for sending, and the second MAC CE further includes the identifier of the at least one second user equipment.

Specifically, in this embodiment, for example, the first message may include one MAC PDU, and the MAC PD includes at least two MAC control elements. A first MAC CE includes the identifier of the at least one second user equipment and the sidelink resource scheduling information of the second user equipment. In the first MAC CE, an identifier (identifier 1) of second user equipment and sidelink resource scheduling information of the second user equipment are arranged in sequence, and then an identifier (identifier 2) of another second user equipment and sidelink resource scheduling information of the another second user equipment are arranged. For example, an identifier of each second user equipment may have a length of, for example, eight bits, and sidelink resource scheduling information of each second user equipment occupies 32 bits. The length of the identifier of the second user equipment and a quantity of bits occupied by the sidelink resource scheduling information of the second user equipment may change based on an actual case, and are not limited in this application.

The second MAC CE includes identifiers of all second user equipments and the third information that indicates the forwarding resource used by the first user equipment to forward the sidelink resource of the at least one second user equipment. In other words, all sidelink resource scheduling information is stored in one MAC CE, and all third information is stored in the other MAC CE.

To enable the first user equipment or the second user equipment receiving the first message to correctly read content in the first message, different logical channel identifier (Logical Channel ID, LCID) values are agreed on for MAC CEs in different formats. When a new MAC CE is agreed on, the second user equipment or the first user equipment establishes a logical channel identifier value table. The table correspondingly stores a plurality of types of MAC CEs and logical channel identifier values corresponding to the MAC CEs. For example, when receiving the first message, the first user equipment first reads an LCID in the first message, determines a type of a MAC CE in the first message based on the pre-stored logical channel identifier value table, and then reads the MAC CE based on the type of the MAC CE.

For example, FIG. 3 is a schematic structural diagram of a MAC CE according to Embodiment 1 of this application. As shown in FIG. 3, a left part of FIG. 3 shows a downlink shared channel (Downlink Shared Channel, DL-SCH) logical channel identifier value table. A left part of the table is indexes indexes of some MAC CEs and MAC SDUs. and a right part of the table is LCID values corresponding to different indexes. Different LCID values correspond to different MAC CEs and MAC SDUs. The table is stored in the network server and the first user equipment. A right part of FIG. 3 shows a possible first MAC CE and second MAC CE, and each Oct (Octet) in the figure represents an eight-bit byte.

Second form of the first message:

The first message further includes third information allocated by the network server to the at least one second user equipment, and the third information indicates a forwarding resource used by the first user equipment to forward the second message of the at least one second user equipment.

The first information, the second information, and the third information of the second user equipment are encapsulated into a first MAC CE in the first message for sending, and the first MAC CE further includes the identifier of the at least one second user equipment.

FIG. 4 is a schematic structural diagram of a MAC CE according to Embodiment 2 of this application. As shown in FIG. 4, different from the first form of the first message, sidelink resource scheduling information of same second user equipment and third information for forwarding by the first user equipment to the second user equipment are stored in one first MAC CE, and one second user equipment occupies one first MAC CE. In other words, a quantity of first MAC CEs in a MAC PDU is the same as a quantity of second user equipments. FIG. 4 shows an example of a structure of the first MAC CE.

Third form of the first message:

The first information and the second information of the at least one second user equipment are encapsulated into a first MAC CE in the first message for sending, and the first MAC CE further includes the identifier of the at least one second user equipment.

FIG. 5 is a schematic structural diagram of a MAC CE according to Embodiment 3 of this application. As shown in FIG. 5, different from the first and second forms of the first message, the third form of the first message includes only the sidelink resource scheduling information of the second user equipment. Because the sidelink resource scheduling information indicates a resource occupied by communication between the second user equipment and the first user equipment, when obtaining the first message, the first user equipment may directly use the sidelink resource, indicated by the sidelink resource scheduling information in the first message, of the second user equipment as a forwarding resource for the first user equipment.

When the second message is sent at the physical (PHY) layer, in this case, the first message sent by the network server to the first user equipment does not need to include the third information. In other words, the forwarding resource used by the first user equipment to forward the second message of the at least one second user equipment does not need to be allocated. In this case, a format of the first message may be shown by the first MAC CE in the right part of FIG. 3, or shown by the first MAC CE in FIG. 4, and a place at which the third information is arranged may be filled with a bit instead.

In the foregoing sidelink resource scheduling embodiments provided in this application, when the first message is sent at the MAC layer, sidelink scheduling may be performed for a plurality of second user equipments at the same time, and a physical layer technology does not need to be modified.

When the first message is in the first form, because sidelink scheduling resource information and forwarding resources of all the second user equipments are respectively stored in the two MAC CEs, only the two MAC CEs are required. Therefore, this form is applicable to a case in which sidelink resource scheduling needs to be performed for a relatively large quantity of second user equipments at the same time. When the first message is in the second form, sidelink scheduling resource information and a forwarding resource of each second user equipment occupy one MAC CE. Because each MAC CE has a corresponding identifier and header, a larger quantity of MAC CEs indicates that the first message occupies more resources. Therefore, this form is applicable to a case in which sidelink resource scheduling is performed for a relatively small quantity of second user equipments at the same time. When the first message is in the third form, no forwarding resource for the first user equipment needs to be encapsulated into the first message, so that resources are saved.

For the solution 3 and the solution 4: The first message from the network server to the first user equipment is sent at the physical layer. To enable the first user equipment to determine a correspondence between each piece of received sidelink resource scheduling information (namely, a first message) and second user equipment, the following feasible implementations are specifically included:

In a first feasible implementation, with reference to FIG. 2, the first message further includes an identifier of each second user equipment, and the receiving, by the first user equipment, the first message sent by the network server in S201 specifically includes:

receiving, by the first user equipment, the first message that is sent by the network server on at least one physical downlink control channel (Physical Downlink Control Channel, PDCCH), where a first message sent on one PDCCH can be used to perform scheduling for only one second user equipment; and the determining, by the first user equipment based on the first message, the second message corresponding to the at least one second user equipment in S202 specifically includes:

obtaining, based on a correspondence between the identifier of the second user equipment and the first information in the first message, the second message corresponding to the second user equipment.

For example, the network server sends the first message to the first user equipment, and the first message includes sidelink resource scheduling information allocated by the network server to each second user equipment and the identifier of the second user equipment. Therefore, the first user equipment may determine, by using identifiers of second user equipments, the second user equipments respectively corresponding to first messages sent on PDCCHs.

In a second feasible implementation, with reference to FIG. 2, the receiving, by the first user equipment, the first message sent by the network server in S201 specifically includes:

receiving, by the first user equipment, the first message that is sent by the network server on at least one PDCCH; and the determining, by the first user equipment based on the first message, the second message corresponding to each second user equipment in S202 specifically includes:

descrambling, by the first user equipment, the PDCCH based on a sidelink radio network temporary identifier of each second user equipment, and determining a correspondence between the first message sent on the PDCCH and the second user equipment; and obtaining, by the first user equipment based on the correspondence between the first message sent on the PDCCH and the second user equipment, the second message corresponding to the second user equipment.

For example, the network server sends the first message to the first user equipment, and the first message includes sidelink resource scheduling information allocated by the network server to each second user equipment. To enable the first user equipment to determine sidelink resource scheduling information corresponding to second user equipment, a PDCCH may be scrambled by using a sidelink radio network temporary identifier (sidelink-Radio Network Temporary Identifier, SL-RNTI) of the second user equipment, and a first message of the second user equipment is sent to the first user equipment on the scrambled PDCCH. When receiving the first message, the first user equipment attempts to descramble the scrambled PDCCH by using pre-stored SL-RNTIs of second user equipments, to find an SL-RNTI that can descramble the PDCCH, and determines that the first message sent on the PDCCH corresponds to the second user equipment corresponding to the SL-RNTI.

The technical solution provided in the foregoing embodiment in which the first message is sent at the physical layer has slight modification to an existing communications protocol, and is easy to understand and implement.

Optionally, when the network server configures the resource allocation manner of scheduling for the first user equipment, and the first message is sent at the physical layer and the second message is sent at the MAC layer, before the second message is sent to the corresponding second user equipment, the method further includes:

obtaining, by the first user equipment, a forwarding resource that is allocated by the network server and that is used to forward the second message of each second user equipment.

For example, when the first message is sent at the physical layer, the first message cannot carry the forwarding resource that is allocated by the network server and that is used to forward the second message of each second user equipment. In this case, the first user equipment may separately request, from the network server, the forwarding resource used to forward the second message of each second user equipment, so that the second message can be sent at the MAC layer.

Based on any one of the foregoing embodiments, when the network server configures the resource allocation manner of scheduling for the first user equipment, a manner for forwarding the second message by the first user equipment includes the following manners:

First manner: When the second message is sent at the MAC layer, when the first user equipment obtains the forwarding resource, the sending the at least one second message to the corresponding second user equipment in S203 specifically includes:

sending, by the first user equipment, the at least one second message to the corresponding second user equipment by using the forwarding resource.

For example, the first user equipment directly uses the received forwarding resource. When the first message is sent at the MAC layer, the forwarding resource may be encapsulated into the first message. When the first message is sent at the physical layer, the forwarding resource may be separately obtained.

Second manner: When the second message is sent at the MAC layer, when the first user equipment obtains no forwarding resource, to be specific, the first message is in the third form in the solution 1 and the solution 2, the sending the at least one second message to the corresponding second user equipment in S203 specifically includes:

sending, by the first user equipment, the at least one second message to the corresponding second user equipment by using the sidelink resource indicated by the sidelink resource scheduling information in the first message.

Specifically, the second message is sent at the MAC layer, the second message further includes the second information of the second user equipment. In this case, the first message may be sent at the MAC layer or the physical layer.

Third manner: When the second message is sent at the physical layer, no forwarding resource needs to be obtained, the first information is encapsulated into sidelink control information (Sidelink Control Information, SCI) of the second message for sending, and the SCI further includes at least one of the following: the identifier of the corresponding second user equipment, a frequency hopping identifier, a time resource mode, and a modulation and coding scheme; and the sending the at least one second message to the corresponding second user equipment in S203 specifically includes:

sending, by the first user equipment, the second message to the corresponding second user equipment on a physical sidelink control channel by using the control channel sidelink resource that is indicated by the second information and that corresponds to the second user equipment.

For example, when the second message is sent at the physical layer, regardless of whether the first message is sent at the MAC layer or the physical layer, the second message includes only the first information, and the first user equipment sends each second message to the corresponding second user equipment on the physical sidelink control channel by using the control channel sidelink resource that is indicated by the second information in the first message and that corresponds to the second user equipment, so that the second user equipment can send the data message to the first user equipment based on the second message.

For example, the first information indicates a resource used to schedule a physical sidelink shared channel (Physical Sidelink Shared Channel, PSSCH), the PSSCH is a channel used to send data between the second user equipment and the first user equipment, the second information indicates a resource used to schedule a physical sidelink control channel (Physical Sidelink Control Channel, PSCCH), and the PSCCH is a channel used to send control signaling between the second user equipment and the first user equipment. A PSSCH resource scheduling part, namely, the first information, may be encapsulated into the SCI. When the first user equipment receives the first message sent by the network server and obtains sidelink resource indication information of the second user equipment, the first user equipment may send the SCI to the second user equipment on a corresponding PSCCH by using a PSCCH resource scheduling part in the sidelink resource indication information. For example, the following table is new SCI provided in this application, namely, an SCI format 2, used to carry the first information, in other words, indicate content of a PSSCH resource scheduling part in the sidelink resource. A reserved bit part serves as padding to ensure that a length of the SCI format 2 is the same as a length of an SCI format 0.

| SCI format 2 | |
| --- | --- |
| Frequency hopping identifier | 1 bit |
| First information | 10 bits |
| Time resource mode | 7 bits |
| Modulation and coding scheme | 5 bits |
| Identifier of second user equipment | 8 bits |
| Reserved bits (which may be set to 0) | 15 bits |

In the solution provided in the foregoing embodiment, the second message is sent at the physical layer. Because the second user equipment does not need to send sidelink control information but needs to send only the data message, the data message can be completely sent within one sidelink control period, thereby implementing rapid scheduling, reducing a scheduling delay, and reducing signaling overheads.

When the network server configures, for the first user equipment, the resource allocation manner of autonomous selection by the first user equipment, when the second message is sent at the MAC layer, before the sending the at least one second message to the corresponding second user equipment in S203, the method further includes:

receiving, by the first user equipment, maximum forwarding duration sent by the network server, where the maximum forwarding duration is used to indicate maximum duration for the first user equipment to send each second message; and the sending the at least one second message to the corresponding second user equipment in S203 specifically includes:

autonomously selecting, by the first user equipment, a resource from the resource pool configured by the network server, and sending each second message to each corresponding second user equipment within the maximum forwarding duration.

For example, when the network server configures, for the first user equipment, the resource allocation manner of autonomous selection by the first user equipment, the first user equipment autonomously selects the resource from the resource pool configured by the network server. Because the network server does not know autonomous behavior of the first user equipment, to be specific, does not know a specific time-frequency location of a resource on which the first user equipment transmits data, the network server cannot reserve the corresponding resource, and resource collision may occur. Therefore, the network server needs to determine a time within which the first user equipment forwards the second message, to reserve a resource to avoid collision.

For example, the network server sends the maximum forwarding duration to the relay user equipment, and reserves the corresponding sidelink resource for the second user equipment to perform sidelink communication, until duration of a maximum time limit expires. Then the first user equipment needs to forward the second message to the second user equipment within duration of "the maximum time limit—a first preset duration". It should be noted that, the maximum time limit is greater than the first preset duration, and the first preset duration may be, for example, a value 6. The first preset duration depends on duration consumed by the second user equipment to parse the received second message. In other words, duration for parsing a MAC PDU is about six milliseconds.

The network server sends the first message to the first user equipment. The network server starts timing after receiving an acknowledgment response message fed back by the first user equipment, until the duration of the maximum time limit expires. The first user equipment starts timing after feeding back the acknowledgment response message to the network server, until the duration of the maximum time limit expires.

When the network server configures, for the first user equipment, the resource allocation manner of autonomous selection by the first user equipment, and the second message is sent at the PHY layer, in this case, the first message sent by the network server to the first user equipment does not need to include the third information. In other words, the forwarding resource used by the first user equipment to forward the second message of the at least one second user equipment does not need to be allocated. In this case, a format of the first message may be shown by the first MAC CE in the right part of FIG. 3, or shown by the first MAC CE in FIG. 4, and a place at which the third information is arranged may be filled with a bit instead.

Optionally, when the first message is in the first form, if no forwarding resource needs to be configured, the second MAC CE may directly not be configured. Therefore, the first form of the first message is highly flexible.

Optionally, based on any one of the foregoing embodiments, the first user equipment can receive the maximum forwarding duration sent by the network server. The maximum forwarding duration is configured, so that data packet collision can be avoided, thereby improving data transmission efficiency.

Optionally, when the first message is sent at the MAC layer, the maximum forwarding duration may be configured by using the first message. Every time the network server sends the first message to the first user equipment, the maximum forwarding duration is encapsulated into the first message, or sent together with the first message.

Optionally, the maximum forwarding duration may be configured by using RRC signaling. Because the maximum forwarding duration depends only on a speed at which the second user equipment parses received signaling, and does not dynamically change in a scheduling process, the maximum forwarding duration does not need to be configured in each scheduling by using a first message, and may be pre-configured once for all by using the RRC signaling.

Based on any one of the foregoing embodiments, a sending priority of the second message may be set to be higher than a sending priority of another message sent by the first user equipment.

For example, both the first message and the second message in any one of the foregoing embodiments may be encapsulated into a downlink control information (Downlink Control Information, DCI) format 5.

Optionally, based on any one of the foregoing embodiments, as shown in FIG. 3, when the first message is sent at the MAC layer, the first message further includes a logical channel identifier value corresponding to each MAC CE; and the determining, by the first user equipment based on the first message, the second message corresponding to the at least one second user equipment in S202 specifically includes:

reading, by the first user equipment, each MAC CE in the first message based on the logical channel identifier value in the first message; and determining, by the first user equipment based on each MAC CE, the second message corresponding to the at least one second user equipment.

For example, FIG. 6 is a schematic structural diagram of a MAC CE according to Embodiment 4 of this application. As shown in FIG. 6, a left part of FIG. 6 shows a sidelink shared channel (Sidelink Shared Channel, SL-SCH) logical channel identifier value table. The table is stored in the second user equipment and the first user equipment. A right part of FIG. 6 shows a possible third MAC CE, and each Oct (Octet) in the figure represents an eight-bit byte. When the second message is sent at the MAC layer and the second message further includes the second information of the second user equipment, the first information and the second information of each second user equipment are encapsulated into the third MAC CE in the second messages for sending. The third MAC CE further includes the identifier of the second user equipment.

The second message further includes a logical channel identifier value corresponding to the third MAC CE.

Figure 7:
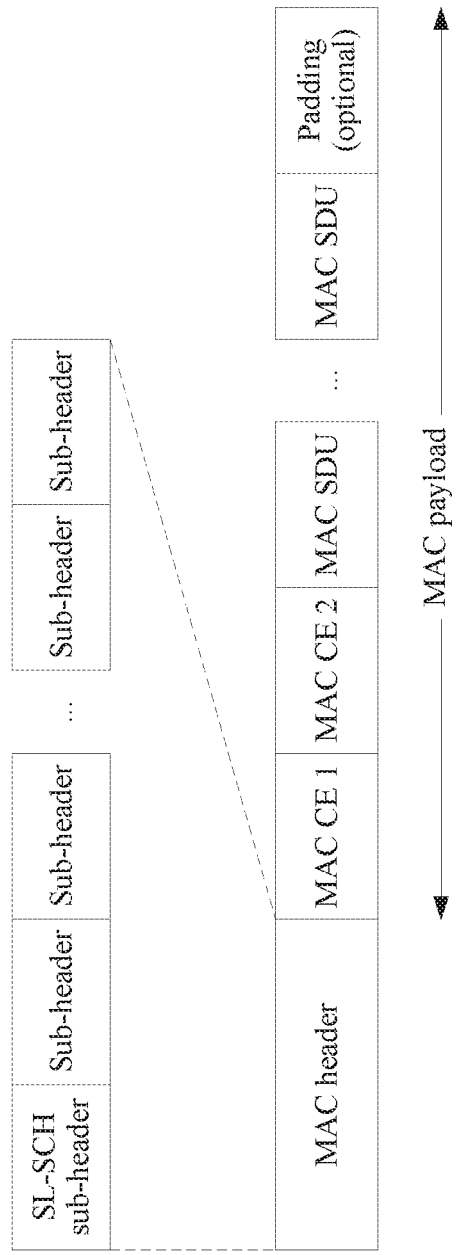
FIG. 7 is a schematic structural diagram of an SL-SCH MAC PDU according to Embodiment 4 of this application.

For example, FIG. 7 is a schematic structural diagram of an SL-SCH MAC PDU according to Embodiment 4 of this application. As shown in FIG. 7, the MAC PDU includes a MAC header (MAC header) and MAC payload (MAC payload). The MAC header includes at least one sub-header (Sub-header), a first sub-header is an SL-SCH sub-header, and the sub-header includes a logical channel identifier value. The MAC payload includes one or more of a MAC CE, a MAC service data unit (Service Data Unit, SDU), and padding (Padding). Logical channel identifier values in sub-headers are arranged in a sequence consistent with that of MAC CEs, MAC SDUs, and padding.

Embodiments of this application further provide relay user equipment, a network server, and remote user equipment that are respectively configured to perform the sidelink resource scheduling methods in the foregoing embodiments. The apparatuses and the methods have same technical features and technical effects, and details are not described again in the embodiments of this application.

Figure 8:
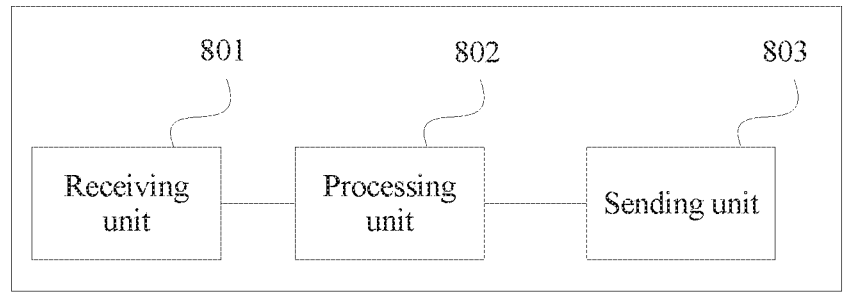
FIG. 8 is a schematic structural diagram of relay user equipment according to Embodiment 1 of this application.

FIG. 8 is a schematic structural diagram of relay user equipment according to Embodiment 1 of this application. As shown in FIG. 8, the relay user equipment includes:

a receiving unit 801, configured to receive a first message sent by a network server, where the first message includes first information, and the first information indicates a data channel sidelink resource allocated by the network server to a corresponding remote user equipment;

a processing unit 802, configured to determine, based on the first message, a second message corresponding to the at least one remote user equipment; and a sending unit 803, configured to send the second message corresponding to the at least one remote user equipment to the corresponding remote user equipment, where the second message includes the first information of the remote user equipment.

Optionally, the first message further includes second information, and the second information indicates a control channel sidelink resource allocated by the network server to the corresponding remote user equipment.

Optionally, the first message further includes third information allocated by the network server to the at least one remote user equipment, and the third information indicates a forwarding resource used by the relay user equipment to forward the second message of the at least one remote user equipment;

the first information and the second information of the at least one remote user equipment are encapsulated into a first MAC CE in the first message for sending, and the first MAC CE further includes an identifier of the at least one remote user equipment; and the third information of the at least one remote user equipment is encapsulated into a second MAC CE in the first message for sending, and the second MAC CE further includes the identifier of the at least one remote user equipment.

Optionally, the first message further includes third information allocated by the network server to the at least one remote user equipment, and the third information indicates a forwarding resource used by the relay user equipment to forward the second message of the at least one remote user equipment; and the first information, the second information, and the third information of the remote user equipment are encapsulated into a first MAC CE in the first message for sending, and the first MAC CE further includes an identifier of the remote user equipment.

Optionally, the first information and the second information of the at least one remote user equipment are encapsulated into a first MAC CE in the first message for sending, and the first MAC CE further includes an identifier of the at least one remote user equipment.

Optionally, the receiving unit 801 is specifically configured to receive the first message that is sent by the network server on at least one physical downlink control channel, where the first message further includes an identifier of the at least one remote user equipment.

Optionally, the receiving unit 801 is specifically configured to receive the first message that is sent by the network server on at least one physical downlink control channel; and the processing unit 802 is specifically configured to descramble the physical downlink control channel based on a sidelink radio network temporary identifier of the remote user equipment, and determine a correspondence between the first message sent on the physical downlink control channel and the remote user equipment.

Optionally, the receiving unit 801 is further configured to obtain a forwarding resource that is allocated by the network server and that is used to forward the second message of the at least one remote user equipment.

Optionally, the sending unit 803 is specifically configured to send the second message corresponding to the at least one remote user equipment to the corresponding remote user equipment by using the forwarding resource.

Optionally, the sending unit 803 is specifically configured to send the second message corresponding to the at least one remote user equipment to the corresponding remote user equipment by using a resource indicated by the first information and the second information in the first message.

Optionally, the first information of the remote user equipment is encapsulated into sidelink control information of the second message for sending, and the sidelink control information further includes at least one of the following: the identifier of the corresponding remote user equipment, a frequency hopping identifier, a time resource mode, and a modulation and coding scheme; and the sending unit 803 is specifically configured to send the second message to the corresponding remote user equipment on a physical sidelink control channel by using the control channel sidelink resource that is indicated by the second information and that corresponds to the remote user equipment.

Optionally, the receiving unit 801 is further configured to receive maximum forwarding duration sent by the network server, where the maximum forwarding duration is used to indicate maximum duration for the relay user equipment to send each second message; and the sending unit 803 is specifically configured to autonomously select a resource from a resource pool configured by the network server, and send the second message corresponding to the at least one remote user equipment to the corresponding remote user equipment within the maximum forwarding duration.

Optionally, the receiving unit 801 is further configured to receive maximum forwarding duration sent by the network server, where the maximum forwarding duration is used to indicate maximum duration for the relay user equipment to send each second message.

Optionally, the maximum forwarding duration is sent by using radio resource control signaling.

Optionally, when information is encapsulated into the first MAC CE in the first message for sending, the maximum forwarding duration is also encapsulated into the first message.

Optionally, a sending priority of the second message is higher than a sending priority of another message sent by the relay user equipment.

Optionally, the first message further includes a logical channel identifier value corresponding to the MAC CE; and the processing unit 802 is specifically configured to read the MAC CE in the first message based on the logical channel identifier value in the first message; and determine, based on the MAC CE, the second message corresponding to the at least one remote user equipment.

Optionally, when the second message further includes the second information of the remote user equipment, the first information and the second information of the remote user equipment are encapsulated into a third MAC CE in the second message for sending, and the third MAC CE further includes the identifier of the remote user equipment; and the second message further includes a logical channel identifier value corresponding to the third MAC CE.

Figure 9:
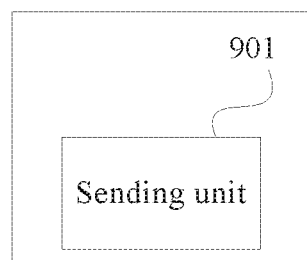
FIG. 9 is a schematic structural diagram of a network server according to Embodiment 1 of this application.

FIG. 9 is a schematic structural diagram of a network server according to Embodiment 1 of this application. As shown in FIG. 9, the network server includes:

a sending unit 901, configured to send a first message to relay user equipment, where the first message is used to determine a second message corresponding to at least one remote user equipment, where the first message includes first information and second information, the first information indicates a data channel sidelink resource allocated by the network server to the corresponding remote user equipment, and the second information indicates a control channel sidelink resource allocated by the network server to the corresponding remote user equipment.

Optionally, the first message further includes third information allocated by the network server to the at least one remote user equipment, and the third information indicates a forwarding resource used by the relay user equipment to forward the second message of the at least one remote user equipment;

the first information and the second information of the at least one remote user equipment are encapsulated into a first MAC CE in the first message for sending, and the first MAC CE further includes an identifier of the at least one remote user equipment; and the third information of the at least one remote user equipment is encapsulated into a second MAC CE in the first message for sending, and the second MAC CE further includes the identifier of the at least one remote user equipment.

Optionally, the first message further includes third information allocated by the network server to the at least one remote user equipment, and the third information indicates a forwarding resource used by the relay user equipment to forward the second message of the at least one remote user equipment; and the first information, the second information, and the third information of the remote user equipment are encapsulated into a first MAC CE in the first message for sending, and the first MAC CE further includes an identifier of the at least one remote user equipment.

Optionally, the first information and the second information of the at least one remote user equipment are encapsulated into a first MAC CE in the first message for sending, and the first MAC CE further includes an identifier of the at least one remote user equipment.

Optionally, the first message further includes an identifier of the remote user equipment corresponding to the first information and the second information, and the sending unit 901 is specifically configured to send the first message to the relay user equipment on at least one physical downlink control channel.

Optionally, the sending unit 901 is specifically configured to send the first message to the relay user equipment on at least one physical downlink control channel scrambled by using a sidelink radio network temporary identifier of the remote user equipment.

Figure 10:
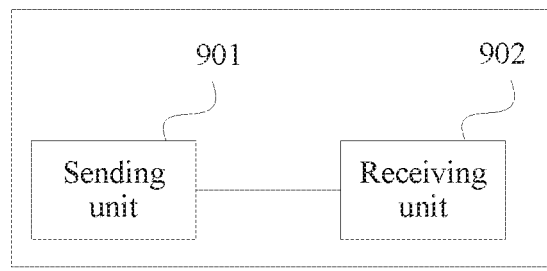
FIG. 10 is a schematic structural diagram of a network server according to Embodiment 2 of this application.

Optionally, based on the embodiment shown in FIG. 9, FIG. 10 is a schematic structural diagram of a network server according to Embodiment 2 of this application. As shown in FIG. 10, the network server further includes:

a receiving unit 902, configured to receive a forwarding resource request message sent by the relay user equipment; and the sending unit 901 is further configured to send, to the relay user equipment, a forwarding resource used to forward the second message of the at least one remote user equipment.

Optionally, the sending unit 901 is further configured to send maximum forwarding duration to the relay user equipment, where the maximum forwarding duration is used to indicate maximum duration for the relay user equipment to send the second message of the at least one remote user equipment.

Optionally, the maximum forwarding duration is sent by using radio resource control signaling.

Optionally, when a sidelink resource is encapsulated into the first MAC CE in the first message for sending, the maximum forwarding duration is also encapsulated into the first MAC CE.

Optionally, the first message further includes a logical channel identifier value corresponding to the MAC CE.

Figure 11:
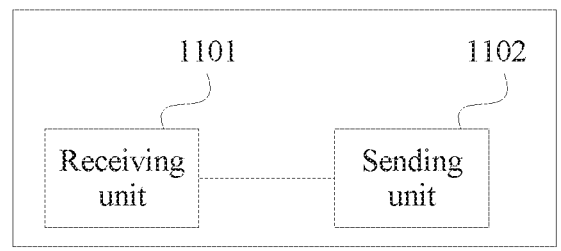
FIG. 11 is a schematic structural diagram of remote user equipment according to Embodiment 1 of this application.

FIG. 11 is a schematic structural diagram of remote user equipment according to Embodiment 1 of this application. As shown in FIG. 11, the remote user equipment includes:

a receiving unit 1101, configured to receive a message sent by relay user equipment, where the message includes first information, and the first information indicates a data channel sidelink resource allocated by a network server to the corresponding remote user equipment; and a sending unit 1102, configured to send a data message to the relay user equipment based on the message.

Optionally, the first information is encapsulated into sidelink control information of the message for sending, and the sidelink control information includes at least one of the following: an identifier of the corresponding remote user equipment, a frequency hopping identifier, a time resource mode, and a modulation and coding scheme; and the sending unit 1102 is specifically configured to send the data message to the relay user equipment on a physical sidelink shared channel based on the first information and at least one of the following: the identifier of the corresponding remote user equipment, the frequency hopping identifier, the time resource mode, and the modulation and coding scheme by using the data channel sidelink resource that is indicated by the first information and that corresponds to the remote user equipment.

Figure 12:
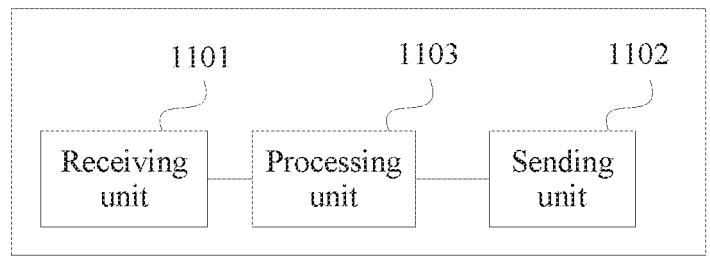
FIG. 12 is a schematic structural diagram of remote user equipment according to Embodiment 2 of this application.

Optionally, based on the embodiment shown in FIG. 11, FIG. 12 is a schematic structural diagram of remote user equipment according to Embodiment 2 of this application. As shown in FIG. 12, the message further includes second information, the second information indicates a control channel sidelink resource allocated by the network server to the corresponding remote user equipment, the first information and the second information of the remote user equipment are encapsulated into a MAC CE in the second message for sending, the MAC CE further includes an identifier of the remote user equipment, and the message further includes a logical channel identifier value corresponding to the MAC CE; and the remote user equipment further includes:

a processing unit 1103, configured to read the MAC CE in the message based on the logical channel identifier value in the message to obtain the first information and the second information.

Figure 13:
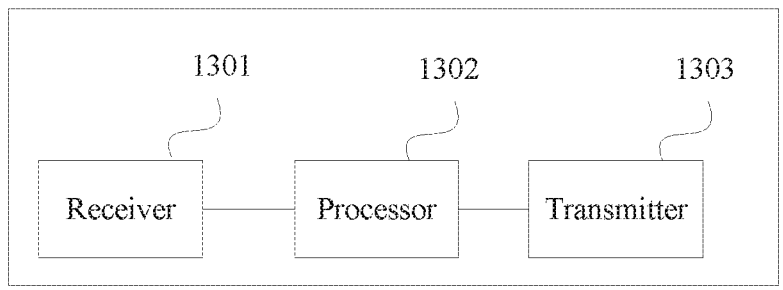
FIG. 13 is a schematic structural diagram of relay user equipment according to Embodiment 2 of this application.

FIG. 13 is a schematic structural diagram of relay user equipment according to Embodiment 2 of this application. As shown in FIG. 13, the relay user equipment includes:

a receiver 1301, configured to receive a first message sent by a network server, where the first message includes first information, and the first information indicates a data channel sidelink resource allocated by the network server to a corresponding remote user equipment;

a processor 1302, configured to determine, based on the first message, a second message corresponding to the at least one remote user equipment; and a transmitter 1303, configured to send the second message corresponding to the at least one remote user equipment to the corresponding remote user equipment, where the second message includes the first information of the remote user equipment.

Optionally, the first message further includes second information, and the second information indicates a control channel sidelink resource allocated by the network server to the corresponding remote user equipment.

Optionally, the first message further includes third information allocated by the network server to the at least one remote user equipment, and the third information indicates a forwarding resource used by the relay user equipment to forward the second message of the at least one remote user equipment;

the first information and the second information of the at least one remote user equipment are encapsulated into a first MAC CE in the first message for sending, and the first MAC CE further includes an identifier of the at least one remote user equipment; and the third information of the at least one remote user equipment is encapsulated into a second MAC CE in the first message for sending, and the second MAC CE further includes the identifier of the at least one remote user equipment.

Optionally, the first message further includes third information allocated by the network server to the at least one remote user equipment, and the third information indicates a forwarding resource used by the relay user equipment to forward the second message of the at least one remote user equipment; and the first information, the second information, and the third information of the remote user equipment are encapsulated into a first MAC CE in the first message for sending, and the first MAC CE further includes an identifier of the remote user equipment.

Optionally, the first information and the second information of the at least one remote user equipment are encapsulated into a first MAC CE in the first message for sending, and the first MAC CE further includes an identifier of the at least one remote user equipment.

Optionally, the receiver 1301 is specifically configured to receive the first message that is sent by the network server on at least one physical downlink control channel; and the first message further includes an identifier of the at least one remote user equipment.

Optionally, the receiver 1301 is specifically configured to receive the first message that is sent by the network server on at least one physical downlink control channel; and the processor 1302 is specifically configured to descramble the physical downlink control channel based on a sidelink radio network temporary identifier of the remote user equipment, and determine a correspondence between the first message sent on the physical downlink control channel and the remote user equipment.

Optionally, the receiver 1301 is further configured to obtain a forwarding resource that is allocated by the network server and that is used to forward the second message of the at least one remote user equipment.

Optionally, the transmitter 1303 is specifically configured to send the second message corresponding to the at least one remote user equipment to the corresponding remote user equipment by using the forwarding resource.

Optionally, the transmitter 1303 is specifically configured to send the second message corresponding to the at least one remote user equipment to the corresponding remote user equipment by using a resource indicated by the first information and the second information in the first message.

Optionally, the first information of the remote user equipment is encapsulated into sidelink control information of the second message for sending, and the sidelink control information further includes at least one of the following: the identifier of the corresponding remote user equipment, a frequency hopping identifier, a time resource mode, and a modulation and coding scheme; and the transmitter 1303 is specifically configured to send the second message to the corresponding remote user equipment on a physical sidelink control channel by using the control channel sidelink resource that is indicated by the second information and that corresponds to the remote user equipment.

Optionally, the receiver 1301 is further configured to receive maximum forwarding duration sent by the network server, where the maximum forwarding duration is used to indicate maximum duration for the relay user equipment to send each second message; and the transmitter 1303 is specifically configured to autonomously select a resource from a resource pool configured by the network server, and send the second message corresponding to the at least one remote user equipment to the corresponding remote user equipment within the maximum forwarding duration.

Optionally, the receiver 1301 is further configured to receive maximum forwarding duration sent by the network server, where the maximum forwarding duration is used to indicate maximum duration for the relay user equipment to send each second message.

Optionally, the maximum forwarding duration is sent by using radio resource control signaling.

Optionally, when information is encapsulated into the first MAC CE in the first message for sending, the maximum forwarding duration is also encapsulated into the first message.

Optionally, a sending priority of the second message is higher than a sending priority of another message sent by the relay user equipment.

Optionally, the first message further includes a logical channel identifier value corresponding to the MAC CE; and the processor 1302 is specifically configured to read the MAC CE in the first message based on the logical channel identifier value in the first message; and determine, based on the MAC CE, the second message corresponding to the at least one remote user equipment.

Optionally, when the second message further includes the second information of the remote user equipment, the first information and the second information of the remote user equipment are encapsulated into a third MAC CE in the second message for sending, and the third MAC CE further includes the identifier of the remote user equipment; and the second message further includes a logical channel identifier value corresponding to the third MAC CE.

Figure 14:
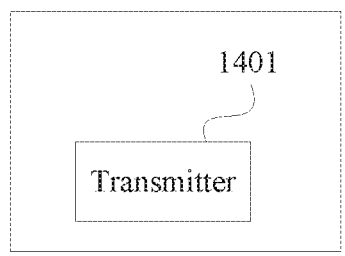
FIG. 14 is a schematic structural diagram of a network server according to Embodiment 3 of this application.

FIG. 14 is a schematic structural diagram of a network server according to Embodiment 3 of this application. As shown in FIG. 14, the network server includes:

a transmitter 1401, configured to send a first message to relay user equipment, where the first message is used to determine a second message corresponding to at least one remote user equipment, where the first message includes first information and second information, the first information indicates a data channel sidelink resource allocated by the network server to the corresponding remote user equipment, and the second information indicates a control channel sidelink resource allocated by the network server to the corresponding remote user equipment.

Optionally, the first message further includes third information allocated by the network server to the at least one remote user equipment, and the third information indicates a forwarding resource used by the relay user equipment to forward the second message of the at least one remote user equipment;

the first information and the second information of the at least one remote user equipment are encapsulated into a first MAC CE in the first message for sending, and the first MAC CE further includes an identifier of the at least one remote user equipment; and the third information of the at least one remote user equipment is encapsulated into a second MAC CE in the first message for sending, and the second MAC CE further includes the identifier of the at least one remote user equipment.

Optionally, the first message further includes third information allocated by the network server to the at least one remote user equipment, and the third information indicates a forwarding resource used by the relay user equipment to forward the second message of the at least one remote user equipment; and the first information, the second information, and the third information of the remote user equipment are encapsulated into a first MAC CE in the first message for sending, and the first MAC CE further includes an identifier of the at least one remote user equipment.

Optionally, the first information and the second information of the at least one remote user equipment are encapsulated into a first MAC CE in the first message for sending, and the first MAC CE further includes an identifier of the at least one remote user equipment.

Optionally, the first message further includes an identifier of the remote user equipment corresponding to the first information and the second information, and the transmitter 1401 is specifically configured to send the first message to the relay user equipment on at least one physical downlink control channel.

Optionally, the transmitter 1401 is specifically configured to send the first message to the relay user equipment on at least one physical downlink control channel scrambled by using a sidelink radio network temporary identifier of the remote user equipment.

Figure 15:
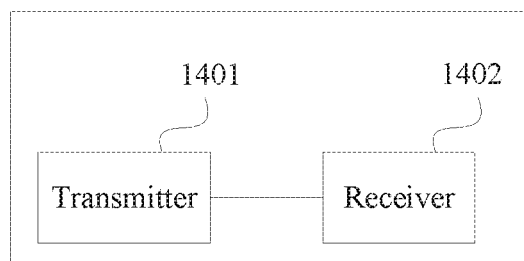
FIG. 15 is a schematic structural diagram of a network server according to Embodiment 4 of this application.

Optionally, based on the embodiment shown in FIG. 14, FIG. 15 is a schematic structural diagram of a network server according to Embodiment 4 of this application. As shown in FIG. 15, the network server further includes:

a receiver 1402, configured to receive a forwarding resource request message sent by the relay user equipment; and the transmitter 1401 is further configured to send, to the relay user equipment, a forwarding resource used to forward the second message of the at least one remote user equipment.

Optionally, the transmitter 1401 is further configured to send maximum forwarding duration to the relay user equipment, where the maximum forwarding duration is used to indicate maximum duration for the relay user equipment to send the second message of the at least one remote user equipment.

Optionally, the maximum forwarding duration is sent by using radio resource control signaling.

Optionally, when a sidelink resource is encapsulated into the first MAC CE in the first message for sending, the maximum forwarding duration is also encapsulated into the first MAC CE.

Optionally, the first message further includes a logical channel identifier value corresponding to the MAC CE.

Figure 16:
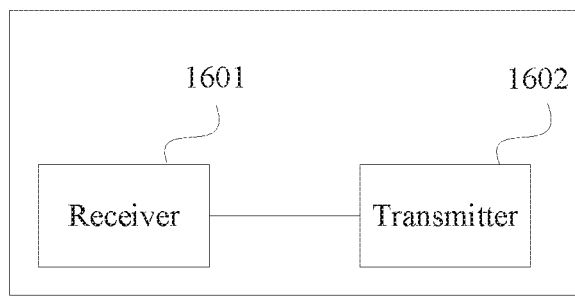
FIG. 16 is a schematic structural diagram of remote user equipment according to Embodiment 3 of this application.

FIG. 16 is a schematic structural diagram of remote user equipment according to Embodiment 3 of this application. As shown in FIG. 16, the remote user equipment includes:

a receiver 1601, configured to receive a message sent by relay user equipment, where the message includes first information, and the first information indicates a data channel sidelink resource allocated by a network server to the corresponding remote user equipment; and a transmitter 1602, configured to send a data message to the relay user equipment based on the message.

Optionally, the first information is encapsulated into sidelink control information of the message for sending, and the sidelink control information includes at least one of the following: an identifier of the corresponding remote user equipment, a frequency hopping identifier, a time resource mode, and a modulation and coding scheme; and the transmitter 1602 is specifically configured to send the data message to the relay user equipment on a physical sidelink shared channel based on the first information and at least one of the following: the identifier of the corresponding remote user equipment, the frequency hopping identifier, the time resource mode, and the modulation and coding scheme by using the data channel sidelink resource that is indicated by the first information and that corresponds to the remote user equipment.

Figure 17:
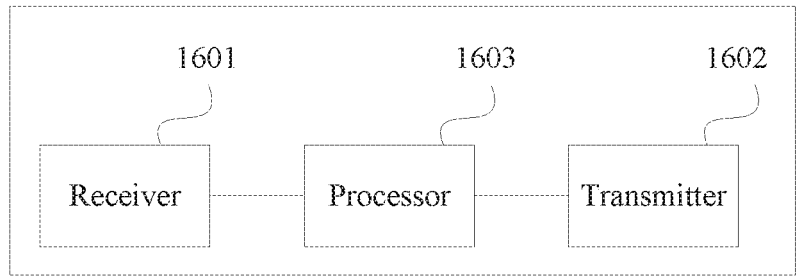
FIG. 17 is a schematic structural diagram of remote user equipment according to Embodiment 4 of this application.

Optionally, based on the embodiment shown in FIG. 16, FIG. 17 is a schematic structural diagram of remote user equipment according to Embodiment 4 of this application. As shown in FIG. 17, the message further includes second information, the second information indicates a control channel sidelink resource allocated by the network server to the corresponding remote user equipment, the first information and the second information of the remote user equipment are encapsulated into a MAC CE in the second message for sending, the MAC CE further includes an identifier of the remote user equipment, and the message further includes a logical channel identifier value corresponding to the MAC CE; and the remote user equipment further includes:

a processor 1603, configured to read the MAC CE in the message based on the logical channel identifier value in the message to obtain the first information and the second information.

An embodiment of this application further provides a sidelink resource scheduling system, including the relay user equipment shown in FIG. 8, the network server shown in FIG. 9 or FIG. 10, and the remote user equipment shown in FIG. 11 or FIG. 12.

An embodiment of this application further provides a computer-readable storage medium, including an instruction. When the instruction runs on a computer, the computer performs the sidelink resource scheduling method performed by the relay user equipment shown in FIG. 8.

An embodiment of this application further provides a computer-readable storage medium, including an instruction. When the instruction runs on a computer, the computer performs the sidelink resource scheduling method performed by the network server shown in FIG. 9 or FIG. 10.

An embodiment of this application further provides a computer-readable storage medium, including an instruction. When the instruction runs on a computer, the computer performs the sidelink resource scheduling method performed by the remote user equipment shown in FIG. 11 or FIG. 12.

What is claimed is:

1. A sidelink resource scheduling method implemented by a first user equipment, wherein the sidelink resource scheduling method comprises:
receiving a first message from a network server, wherein the first message comprises first information that indicates a data channel sidelink resource allocated by the network server to second user equipment, and further comprises second information that indicates a control channel sidelink resource allocated by the network server to the second user equipment;
receiving a maximum forwarding duration from the network server, wherein the maximum forwarding duration indicates a maximum duration for which the first user equipment is allowed to send the second message, said maximum forwarding duration calculated based on an anticipated parsing time of the second message;
determining, based on the first message, a second message corresponding to the second user equipment, wherein the second message comprises the first information;
after receiving the maximum forwarding duration, sending the second message to the second user equipment; and
receiving, from the second user equipment, after sending the second message to the second user equipment and based on the second message comprising the first information, a data message, wherein the first user equipment does not receive a control message from the second user equipment between sending the second message to the second user equipment and receiving the data message.

2. The sidelink resource scheduling method of claim 1, wherein the first message further comprises third information allocated by the network server to the second user equipment, wherein the third information indicates a forwarding resource used by the first user equipment to forward the second message of the second user equipment, wherein the first information and the second information of the second user equipment are encapsulated into a first media access control (MAC) control element (MAC CE) in the first message for sending, wherein the first MAC CE further comprises an identifier of the at least one second user equipment, wherein the third information of the second user equipment is encapsulated into a second MAC CE in the first message for sending, and wherein the second MAC CE further comprises the identifier of the second user equipment.

3. The sidelink resource scheduling method of claim 1, wherein the first message further comprises third information allocated by the network server to the second user equipment, wherein the third information indicates a forwarding resource used by the first user equipment to forward the second message, wherein the first information, the second information, and the third information of the second user equipment are encapsulated into a first media access control (MAC) control element (MAC CE) in the first message for sending, and wherein the first MAC CE further comprises an identifier of the second user equipment.

4. The sidelink resource scheduling method of claim 1, wherein the first information and the second information of the second user equipment are encapsulated into a first media access control (MAC) control element (MAC CE) in the first message for sending, and wherein the first MAC CE further comprises an identifier of the second user equipment.

5. The sidelink resource scheduling method of claim 4, wherein sending the second message comprises sending the second message to the second user equipment using a resource indicated by the first information and the second information in the first message.

6. The sidelink resource scheduling method of claim 1, wherein receiving the first message comprises receiving the first message from the network server on at least one physical downlink control channel, and wherein the first message further comprises an identifier of the second user equipment.

7. The sidelink resource scheduling method of claim 1, wherein receiving the first message comprises receiving the first message from the network server on at least one physical downlink control channel, and wherein determining the second message comprises:
descrambling the at least one physical downlink control channel based on a sidelink radio network temporary identifier of the second user equipment; and
determining a correspondence between the first message sent on the physical downlink control channel and the second user equipment.

8. The sidelink resource scheduling method of claim 1, wherein the first information of the second user equipment is encapsulated into sidelink control information of the second message for sending, wherein the sidelink control information further comprises at least one of an identifier of the second user equipment, a frequency hopping identifier, a time resource mode, or a modulation and coding scheme, and wherein sending the second message to the second user equipment comprises sending the second message to the second user equipment on a physical sidelink control channel using the control channel sidelink resource.

9. The sidelink resource scheduling method of claim 1, wherein before sending the second message to the second user equipment, the sidelink resource scheduling method further comprises:
autonomously selecting a resource from a resource pool configured by the network server,
wherein sending the second message to the second user equipment comprises sending the second message to the second user equipment within an amount of time calculated based on the maximum forwarding duration and an anticipated parsing time for the second message.

10. A sidelink resource scheduling method implemented by a network server, wherein the sidelink resource scheduling method comprises:
allocating a data channel sidelink resource and a control channel sidelink resource to second user equipment;
sending a first message to a first user equipment, wherein the first message comprises first information and second information, wherein the first information indicates the data channel sidelink resource allocated to the second user equipment, and wherein the second information indicates the control channel sidelink resource allocated to the second user equipment;
providing a maximum forwarding duration to the first user equipment, wherein the maximum forwarding duration indicates a maximum duration for which the first user equipment is allowed to send the second message, said maximum forwarding duration calculated based on an anticipated parsing time of the second message;
receiving, from the second user equipment, based on at least one of the data channel sidelink resource and the control channel sidelink resource and based on the maximum forwarding duration, a data message, wherein the first user equipment does not receive a control message from the second user equipment between when the first message is sent from the network server to the first user equipment and when the data message is received from the second user equipment.

11. The sidelink resource scheduling method of claim 10, wherein the first message further comprises third information allocated by the network server to the second user equipment, wherein the third information indicates a forwarding resource to be used by the first user equipment to forward the second message, wherein the first information and the second information of the second user equipment are encapsulated into a first media access control (MAC) control element (MAC CE) in the first message for sending, wherein the first MAC CE further comprises an identifier of the second user equipment, wherein the third information of the second user equipment is encapsulated into a second MAC CE in the first message for sending, and wherein the second MAC CE further comprises the identifier of the second user equipment.

12. The sidelink resource scheduling method of claim 10, wherein the first message further comprises third information allocated by the network server to the second user equipment, wherein the third information indicates a forwarding resource to be used by the first user equipment to forward the second message, wherein the first information, the second information, and the third information of the second user equipment are encapsulated into a first media access control (MAC) control element (MAC CE) in the first message for sending, and wherein the first MAC CE further comprises an identifier of the second user equipment.

13. The sidelink resource scheduling method of claim 10, wherein the first information and the second information of the second user equipment are encapsulated into a first media access control (MAC) control element (MAC CE) in the first message for sending, and wherein the first MAC CE further comprises an identifier of the second user equipment.

14. The sidelink resource scheduling method of claim 10, wherein the first message further comprises an identifier of the second user equipment, and wherein sending the first message to the first user equipment comprises sending the first message to the first user equipment on at least one physical downlink control channel.

15. The sidelink resource scheduling method of claim 10, wherein sending the first message to the first user equipment comprises sending the first message to the first user equipment on at least one physical downlink control channel scrambled using a sidelink radio network temporary identifier of the second user equipment.

16. A sidelink resource scheduling method, wherein the sidelink resource scheduling method is implemented by a first user equipment, and wherein the sidelink resource scheduling method comprises:
receiving a message from a second user equipment within a maximum forwarding duration set by a network server based on an anticipated parsing time of the message, wherein the message comprises first information and second information, wherein the first information indicates a data channel sidelink resource allocated by a network server to the first user equipment, and wherein the second information indicates a control channel sidelink resource allocated by the network server to the first user equipment; and
sending a data message to the second user equipment based on the message within the anticipated parsing time of the message, without maintaining a link between the first user equipment and the network server.

17. The sidelink resource scheduling method of claim 16, wherein the first information is encapsulated into sidelink control information of the message, wherein the sidelink control information comprises at least one of an identifier of the first user equipment, a frequency hopping identifier, a time resource mode, or a modulation and coding scheme, wherein sending the data message to the second user equipment comprises sending the data message to the second user equipment on a physical sidelink shared channel based on the first information and at least one of the identifier of the first user equipment, the frequency hopping identifier, the time resource mode, or the modulation and coding scheme using the data channel sidelink resource indicated by the first information corresponding to the first user equipment.

18. The sidelink resource scheduling method of claim 16, wherein the message further comprises second information, wherein the second information indicates a control channel sidelink resource allocated by the network server to the first user equipment, wherein the first information and the second information are encapsulated into a media access control (MAC) control element (MAC CE) in the message, wherein the MAC CE further comprises an identifier of the first user equipment, wherein the message further comprises a logical channel identifier value corresponding to the MAC CE, and wherein after receiving the message from the second user equipment, the sidelink resource scheduling method further comprises reading the MAC CE in the message based on the logical channel identifier value in the message to obtain the first information and the second information.

* * * * *